(12) United States Patent
Laberge et al.

(10) Patent No.: US 10,002,680 B2
(45) Date of Patent: Jun. 19, 2018

(54) PRESSURE WAVE GENERATOR AND CONTROLLER FOR GENERATING A PRESSURE WAVE IN A LIQUID MEDIUM

(75) Inventors: Michel Georges Laberge, West Vancouver (CA); Daniel Gelbart, Vancouver (CA); Ross Henry Hill, Coquitlam (CA); Denis J. Connor, West Vancouver (CA)

(73) Assignee: General Fusion Inc., Burnaby, British Columbia (CA)

( * ) Notice: Subject to any disclaimer, the term of this patent is extended or adjusted under 35 U.S.C. 154(b) by 708 days.

(21) Appl. No.: 12/643,792

(22) Filed: Dec. 21, 2009

(65) Prior Publication Data
US 2010/0163130 A1  Jul. 1, 2010

Related U.S. Application Data

(63) Continuation of application No. 11/072,963, filed on Mar. 4, 2005, now abandoned.

(51) Int. Cl.
*F16B 21/12* (2006.01)
*G10K 15/04* (2006.01)
(Continued)

(52) U.S. Cl.
CPC ............. *G21B 3/00* (2013.01); *F03G 7/002* (2013.01); *F15B 21/12* (2013.01); *G10K 15/043* (2013.01); *Y02E 30/18* (2013.01); *Y10T 137/2191* (2015.04)

(58) Field of Classification Search
None
See application file for complete search history.

(56) References Cited

U.S. PATENT DOCUMENTS 2,715,389 A  8/1955  Johnson
2,939,048 A  5/1960  Waniek
(Continued)

FOREIGN PATENT DOCUMENTS

CA  2031841  6/1992
CA  2104939  4/1995
(Continued)

OTHER PUBLICATIONS

A. Prosperetti, "No Nuclear Fusion from glowing bubbles", http://ci.mond.org/9708/970810.html.
(Continued)

*Primary Examiner* — Sharon M Davis
(74) *Attorney, Agent, or Firm* — Knobbe, Martens, Olson & Bear, LLP

(57) ABSTRACT

An apparatus for generating a pressure wave in a liquid medium is disclosed. The apparatus includes a plurality of pressure wave generators having respective moveable pistons, the pistons having respective control rods connected thereto. The apparatus also includes a plurality of transducers coupled to the liquid medium and means for causing the pistons of respective ones of the plurality of the pressure wave generators to be accelerated toward respective ones of the plurality of transducers. The apparatus further includes means for causing restraining forces to be applied to respective control rods to cause respective pistons to impact respective transducers at respective desired times and with respective desired amounts of kinetic energy such that the respective desired amounts of kinetic energy are converted into a pressure wave in the liquid medium.

11 Claims, 14 Drawing Sheets

(51) Int. Cl.
*F03G 7/00* (2006.01)
*G21B 3/00* (2006.01)
*F15B 21/12* (2006.01)
*B01J 3/08* (2006.01)

(56) References Cited

U.S. PATENT DOCUMENTS

| | | |
|---|---|---|
| 2,953,718 A | 9/1960 | Ducati |
| 2,991,238 A | 7/1961 | Phillips et al. |
| 3,189,523 A | 6/1965 | Patrick |
| 3,194,739 A | 7/1965 | Kerst et al. |
| 3,309,967 A | 3/1967 | Taplin |
| 3,313,707 A | 4/1967 | Amsler |
| 3,338,788 A | 8/1967 | Linhart |
| 3,341,189 A | 9/1967 | Rollin |
| 3,346,458 A | 10/1967 | Scmidt |
| 3,465,742 A | 9/1969 | Herr |
| 3,503,472 A | 3/1970 | Axthammer |
| 3,631,760 A | 1/1972 | Moran |
| 3,748,226 A | 7/1973 | Ribe et al. |
| 3,753,304 A | 8/1973 | Hughes |
| 3,925,990 A | 12/1975 | Gross |
| 3,973,468 A | 8/1976 | Russell, Jr. |
| 3,983,303 A | 9/1976 | Biermann et al. |
| 3,990,351 A | 11/1976 | Sundin |
| 4,012,166 A | 3/1977 | Kaesser et al. |
| 4,026,192 A | 5/1977 | Noren et al. |
| 4,049,367 A | 9/1977 | Tominaga et al. |
| 4,068,147 A | 1/1978 | Wells |
| 4,140,057 A | 2/1979 | Turchi et al. |
| 4,166,760 A | 9/1979 | Fowler et al. |
| 4,182,650 A | 1/1980 | Fischer |
| 4,196,788 A | 4/1980 | Sciard |
| 4,207,154 A | 6/1980 | Lemelson |
| 4,217,171 A | 8/1980 | Schaffer |
| 4,228,380 A | 10/1980 | Wells |
| 4,252,605 A | 2/1981 | Schaffer |
| 4,257,798 A | 3/1981 | Hendricks et al. |
| 4,263,095 A | 4/1981 | Thode |
| 4,269,658 A | 5/1981 | Ohkawa |
| 4,269,659 A | 5/1981 | Goldberg |
| 4,277,305 A | 7/1981 | Bohachevsky |
| 4,284,164 A | 8/1981 | Airhart |
| 4,290,848 A | 9/1981 | Sudan |
| 4,292,126 A | 9/1981 | Ohkawa |
| 4,292,568 A | 9/1981 | Wells et al. |
| 4,304,627 A | 12/1981 | Lewis |
| 4,305,784 A | 12/1981 | Ohkawa |
| 4,328,070 A | 5/1982 | Winterberg |
| 4,333,796 A | 6/1982 | Flynn |
| 4,342,720 A | 8/1982 | Wells |
| 4,363,775 A | 12/1982 | Bussard et al. |
| 4,367,130 A | 1/1983 | Lemelson |
| 4,385,880 A | 5/1983 | Lemelson |
| 4,390,322 A | 6/1983 | Budzich |
| 4,435,354 A | 3/1984 | Winterberg |
| 4,449,892 A | 5/1984 | Bentley |
| 4,454,850 A | 6/1984 | Horvath |
| 4,534,263 A | 8/1985 | Heyne et al. |
| 4,563,341 A | 1/1986 | Flynn |
| 4,625,681 A | 12/1986 | Sutekiyo |
| 4,643,854 A | 2/1987 | Kendall, Jr. et al. |
| 4,687,045 A | 8/1987 | Roller |
| 4,735,762 A | 4/1988 | Lasche |
| 4,761,118 A | 8/1988 | Zanarini |
| 4,790,735 A | 12/1988 | Mayer |
| 4,930,355 A | 6/1990 | Heck |
| 5,015,432 A | 5/1991 | Koloc |
| 5,041,760 A | 8/1991 | Koloc |
| 5,087,435 A | 2/1992 | Potter et al. |
| 5,114,261 A | 5/1992 | Sugimoto et al. |
| 5,160,695 A | 11/1992 | Bussard |
| 5,227,239 A | 7/1993 | Upadhye et al. |
| 5,305,091 A | 4/1994 | Gelbart et al. |
| 5,394,131 A | 2/1995 | Lungu |
| 5,397,961 A | 3/1995 | Ayers et al. |
| 5,429,030 A | 7/1995 | Tidman |
| 5,526,885 A | 6/1996 | Kuvshinov et al. |
| 5,659,173 A | 8/1997 | Putterman et al. |
| 5,818,498 A | 10/1998 | Richardson et al. |
| 5,858,104 A | 1/1999 | Clark |
| 5,920,394 A | 7/1999 | Gelbart et al. |
| 5,968,323 A | 10/1999 | Pless |
| 6,181,362 B1 | 1/2001 | Laberge |
| 6,235,067 B1 | 5/2001 | Ahern et al. |
| 6,252,662 B1 | 6/2001 | Laberge |
| 6,377,739 B1 | 4/2002 | Richardson |
| 6,408,052 B1 | 6/2002 | McGeoch |
| 6,532,887 B1 * | 3/2003 | Venier et al. .................. 114/312 |
| 6,587,211 B1 | 7/2003 | Gelbart |
| 6,660,997 B2 | 12/2003 | Laberge et al. |
| 6,665,048 B2 | 12/2003 | Gelbart |
| 6,729,277 B2 | 5/2004 | Yamaki et al. |
| 6,763,160 B2 | 7/2004 | Laberge et al. |
| 6,832,552 B2 | 12/2004 | Patten et al. |
| 6,837,145 B1 | 1/2005 | McBride et al. |
| 6,842,553 B2 | 1/2005 | Richardson |
| 6,941,035 B2 | 9/2005 | Laberge et al. |
| 7,100,494 B2 | 9/2006 | Petersen et al. |
| 7,119,491 B2 | 10/2006 | Rostoker et al. |
| 7,180,082 B1 | 2/2007 | Hassanein et al. |
| 7,180,242 B2 | 2/2007 | Rostoker et al. |
| 7,232,985 B2 | 6/2007 | Monkhorst et al. |
| 7,260,462 B2 | 8/2007 | Keim et al. |
| 7,559,542 B2 | 7/2009 | Cotter |
| 7,613,271 B2 | 11/2009 | Rostoker et al. |
| 7,679,025 B1 | 3/2010 | Krishnan et al. |
| 8,887,618 B2 | 11/2014 | McIlwraith et al. |
| 8,891,719 B2 | 11/2014 | Howard et al. |
| 2002/0057754 A1 | 5/2002 | Stauffer et al. |
| 2002/0090047 A1 | 7/2002 | Stringham |
| 2003/0074010 A1 | 4/2003 | Taleyarkhan |
| 2003/0215046 A1 | 11/2003 | Hornkohl |
| 2004/0141578 A1 | 7/2004 | Enfinger |
| 2005/0129161 A1 | 6/2005 | Laberge |
| 2005/0271181 A1 | 12/2005 | Winterberg |
| 2006/0039519 A1 | 2/2006 | Rostoker et al. |
| 2006/0076897 A1 | 4/2006 | Rostoker et al. |
| 2006/0198483 A1 | 9/2006 | Laberge |
| 2006/0198486 A1 | 9/2006 | Laberge et al. |
| 2006/0198487 A1 | 9/2006 | Laberge |
| 2007/0096659 A1 | 5/2007 | Monkhorst et al. |
| 2007/0158534 A1 | 7/2007 | Monkhorst et al. |
| 2007/0172017 A1 | 7/2007 | Rostoker et al. |
| 2009/0059718 A1 * | 3/2009 | Tessien .................. 366/267 |
| 2009/0213976 A1 | 8/2009 | Gioscia et al. |
| 2011/0026657 A1 | 2/2011 | Laberge et al. |
| 2011/0026658 A1 | 2/2011 | Howard et al. |
| 2011/0243292 A1 | 10/2011 | Howard et al. |
| 2011/0293056 A1 | 12/2011 | Slough |
| 2014/0165552 A1 | 6/2014 | McIlwraith et al. |
| 2014/0247913 A1 | 9/2014 | Laberge et al. |
| 2015/0036777 A1 | 2/2015 | Howard et al. |

FOREIGN PATENT DOCUMENTS

| | | |
|---|---|---|
| CA | 2124364 | 11/1995 |
| CA | 2262581 | 2/1998 |
| CA | 2477960 | 2/2004 |
| CA | 2750441 | 8/2010 |
| CH | 607236 | 11/1978 |
| DE | 2516296 | 10/1975 |
| EP | 0662693 | 2/1995 |
| GB | 774052 | 6/1954 |
| GB | 825026 | 12/1959 |
| JP | 50-120100 | 9/1975 |
| JP | 58-22675 | 2/1983 |
| JP | 03067196 A | 3/1991 |
| JP | 03226694 A | 10/1991 |
| JP | 06317684 A | 11/1994 |
| WO | WO 80/00045 | 1/1980 |
| WO | WO 90/13129 | 11/1990 |
| WO | WO 90/13136 | 11/1990 |
| WO | WO 90/14670 | 11/1990 |

(56) References Cited

FOREIGN PATENT DOCUMENTS

| WO | WO-91/10242 A2 * | 7/1991 | ............... H01F 7/16 |
|---|---|---|---|
| WO | WO 91/13531 | 9/1991 | |
| WO | 93/23587 A1 | 11/1993 | |
| WO | WO 94/16446 | 7/1994 | |
| WO | WO 95/03611 | 2/1995 | |
| WO | WO 95/16995 | 6/1995 | |
| WO | WO 96/21230 | 7/1996 | |
| WO | WO 96/36969 | 11/1996 | |
| WO | WO 97/49274 | 12/1997 | |
| WO | WO 99/56284 | 11/1999 | |
| WO | WO 01/39197 | 5/2001 | |
| WO | WO 01/39198 A2 | 5/2001 | |
| WO | WO 01/39199 A2 | 5/2001 | |
| WO | WO 01/39200 A2 | 5/2001 | |
| WO | WO 01/39201 A2 | 5/2001 | |
| WO | WO 01/39202 A2 | 5/2001 | |
| WO | WO 01/39203 A2 | 5/2001 | |
| WO | WO 01/39204 A2 | 5/2001 | |
| WO | WO 01/39205 A2 | 5/2001 | |
| WO | WO 01/39206 A2 | 5/2001 | |
| WO | WO 02/05292 | 1/2002 | |
| WO | WO 02/097823 | 12/2002 | |
| WO | WO 03/034441 | 4/2003 | |
| WO | WO 03/077260 | 9/2003 | |
| WO | 2010114360 A1 | 10/2010 | |
| WO | WO 2011/014577 | 2/2011 | |
| WO | 2012/113057 A1 | 8/2012 | |

OTHER PUBLICATIONS

C. W. Hartman et al, "Acceleration of Spheromak Toruses, Experimental results and fusion applications", OSTI ID: 5240480; DE90005312 , Proceedings of 11th US/Japan workshop on field-reversed configurations and compact toroids; Nov. 7-9, 1989, Dec. 1, 1989, Los Alamos, NM, USA.

D. Braaten, "'Ridiculously easy' test yields claim of energy triumph", Washington Times, Mar. 24, 1989.

J. Wilson, "Hot Sounds", http://www. popularmechan ic.com/science/research/12816666.html, Feb. 1, 1998.

L. Bertolini, et al, "SHARP, a first step towards a full sized Jules Verne Launcher", Lawrence Livermore National Lab; OSTI ID: 10125664; Legacy ID: DE94007029 Report No. UCRL-JC-114041; CONF-9305233-2, May 1, 1993, Issue CONF-9305233-2.

Moss et al, "The Physics of Fluids", 1994, vol. 6 , Issue (9), pp. 2979-2985.

R. E. Peterkin, Jr., , "Direct electromagnetic acceleration of a compact toroid to high density and high speed", Physical Review Letters, Apr. 17, 1995, vol. 74, Issue 16, pp. 3165-3168.

Browning, P.K. et al., "Power Flow in a Gun-Injected Spheromak Plasma", The American Physical Society, Physical Review Letters, vol. 68, No. 11, Mar. 16, 1992, pp. 1718-1721.

D.N. Hill et al., "Field and Current Amplification in the Sspx Spheromak," 19th IAEA Fusion Energy Conference, Oct. 8, 2002, in 8 pages.

Fowler, T.K., "Pulsed Spheromak Fusion Reactors", Comments on Plasma Physics & Controlled Fusion, Comments on Modern Physics, vol. 1(3), Part C, 1999, pp. 83-98.

Fowler, T.K., "Pulsed Spheromak Reactor With Adiabatic Compression", Lawrence Livermore National Laboratory, in 13 pages, Mar. 29, 1999.

Fowler, T.K., "Stability of Spheromaks Compressed by Liquid Walls", Lawrence Livermore National Laboratory, in 9 pages, Aug. 17, 1999.

Howard, S. et al., "Development of merged compact toroids for use as a magnetized target fusion plasma," Journal of Fusion Energy, Nov. 11, 2008, vol. 28, No. 2, pp. 156-161, available Jun. 2008.

Hsu, S.C. et al., "On the Jets, Kinks, and Spheromaks Formed by a Planar Magnetized Coaxial Gun", California Institute of Technology, Pasadena, CA 91125, Feb. 2, 2008, pp. 1-16.

International Search Report and Written Opinion dated Jun. 23, 2009 for Int'l Application No. PCT/IB2010/000368.

International Search Report and Written Opinion dated Nov. 30, 2010 for Int'l Application No. PCT/US2010/043587.

Intrator, T. et al., "A high density field reversed configuration (FRC) target for magnetized target fusion: First internal profile measurements of a high density FRC," Phys. Plasmas, vol. 11, No. 5, pp. 2580-2585, May 2004.

Kirkpatrick, R.C., "Assessment of the Acoustically Driven MTF Experiments being conducted by Dr. Michel Laberge of General Fusion, Inc.," in 3 pages, May 2007.

Thio, Y.C.F., et al., "Magnetized Target Fusion Driven by Plasma Liners", 2002, in 3 pages.

Laberge, M., "Acoustic Wave Driven MTF Fusion Reactor," in 20 pages, Mar. 2007.

Laberge, M., "An Acoustically Driven Magnetized Target Fusion Reactor," Journal of Fusion Energy, vol. 27, Nos. 1-2, pp. 65-68, Jul. 11, 2007.

Laberge, M., "Evidence of Fusion Products in Acoustically Driven MTF," in 41 pages, Mar. 2007.

Laberge, M., "Experimental Results for an Acoustic Driver for MTF," Journal of Fusion Energy, Jun. 2009, vol. 28, Nos. 2, pp. 179-182, available Jun. 2008.

Liu, D. et al., "Bench Test and Preliminary Results of Vertical Compact Torus Injection Experiments on the STOR-M Tokamak", Nuclear Fusion 46 (006) pp. 104-109, Dec. 16, 2005.

Miyazawa, J. et al., "Design of Spheromak Injector Using Conical Accelerator for Large Helical Device", Fusion Engineering and Design 54 (2001), pp. 1-12.

Olynyk, G. et al., "Development of a Compact Toroid Fuelling System for ITER", Nuclear Fusion, vol. 48, No. 9, Sep. 2008, in pages, published online Aug. 5, 2008.

Olynyk, G. M., "Design and evaluation of a repetitive-fire compact toroid fuelling system for ITER," thesis submitted to the Department of Physics, Queen's University, Ontario, Canada, Mar. 2007, in 48 pages.

R.C. Duck et al., "Structure of the n=1 responsible for relaxation and current drive during sustainment of the SPHEX spheromak", Plasma Physics and Controlled Fusion, vol. 39, No. 5, May 1997, pp. 715-736.

Raman, R. et al., "Compact Toroid Fuelling for ITER", Fusion Engineering and Design 39-40 (1998), pp. 977-985.

Raman, R. et al., "Experimental Demonstration of Nondisruptive, Central Fueling of a Tokamak by Compact Toroid Injection," Phys. Rev. Lett., 1994, pp. 3101-3105.

Raman, R. et al., "Experimental Demonstration of Tokamak Fueling by Compact Toroid Injection," Nuclear Fusion, vol. 37, 1997, pp. 967-972.

Raman, R. et al., "ITER Task D315 (1997): Conceptual Design Definition of a Compact Toroid Injection System", CFFTP G-9729, in 24 pages, Sep. 1997.

Raman, Roger et al., "Design of the Compact Toroid Fueler for Center Fueling Tokamak de Varennes", Fusion Technology, A Journal of the American Nuclear Society, vol. 24, No. 3, Nov. 1993, pp. 239-250.

Siemon, R.E. et al., "Why Magnetized Target Fusion Offers a Low-Cost Development Path for Fusion Energy," in 49 pages, Dec. 1997.

Wurden, G.A. et al., "FRC Plasma Studies on the FRX-L Plasma Injector for MTF", Paper IC/P6-53, 20th IAEA Fusion Energy Conference, Nov. 2004, in 7 pages.

Wurden, G.A. et al., "High Pressure Field Reversed Configuration Plasmas in FRX-L for Magnetized Target Fusion", in 2 pages, Jan. 26, 2006.

Wurden, G.A. et al., "Magnetized Target Fusion: A Burning FRC Plasma in an Imploded Metal Can," J. Plasma Fusion Res. Series, vol. 2, pp. 238-241, Aug. 1999.

Wurden, G.A. et al., "Progress on the FRX-L FRC Plasma Injector at LANL for Magnetized Target Fusion", pp. 1-6, Mar. 1, 2002.

Wurden, G.A., Letter to Dr. Laberge, in 1 page, May 2007.

(56) References Cited

OTHER PUBLICATIONS

Xiao, C. et al., "Improved Confinement Induced by Tangential Injection of Compact Torus Into the Saskatchewan Torus-Modified (STOR-M) Tokamak," Phys. Plasmas, vol. 11, No. 8, Aug. 2004, pp. 4041-4049.
Tobin, M. T., et al., "The Compact Torus Accelerator, A Driver for ICF," UCRL-93901-R1, Lawrence Livermore National Laboratory, Jul. 31, 1986, in 9 pages.
CH. Seife, "Sun in a Bottle", Chapter 10, pp. 220-227, Penguin Books Ltd., London, UK (2008).
Schaffer, M.J., "Slow Liner Fusion," General Atomics Report GA-A22689, Aug., 1997, in 6 pages.
B. E. McDonald, "Modeling nonlinear compressional waves in marine sediments", Nonlin. Processes Geophys., vol. 16, Feb. 26, 2009, pp. 151-157.
CH. Mangeant et al., "Syrinx Project: Compact Pulse-Current Generators Devoted to Material Study Under Isentropic Compression Loading", in Pulsed Power Plasma Science, IEEE, Jun. 2001, in 4 pages.
D. Orlikowski et al., "New experimental capabilities and theoretical insights of high pressure compression waves", Lawrence Livermore National Laboratory, UCRL-PROC-233023, Jul. 24, 2007, 10 pages.
Gregory H. Miller et al., "The Equation of State of a Molten Komatiite 1. Shock Wave Compression to 36 GPa", Journal of Geophysical Research, vol. 96, No. B7, Jul. 10, 1991, pp. 11,831-11,848.
Hitoshi Takeuchi et al., "Equations of State of Matter from Shock Wave Experiments", Journal of Geophysical Research, vol. 71, No. 16, Aug. 15, 1966, pp. 3985-3994.
International Preliminary Report on Patentability dated Jan. 31, 2012 for Int'l Application No. PCT/US2010/043587 in 8 pages.
J. Nguyen et al., "Specifically Prescribed Dynamic Thermodynamic Paths and Resolidification Experiments", Lawrence Livermore National Laboratory, UCRL-JRNL-201169, Nov. 25, 2003, in 8 pages.
R. S. Hawke, "Design and Analysis of Isentropic Compression Experiments", Lawrence Livermore Laboratory, Preprint UCRL-81797, May 7, 1979, in 23 pages.
R.G. Kraus et al., "Equation of state of ductile granular materials", DYMAT International Conference on Mechanical and Physical Behaviour of Materials,,Sep. 2009, pp. 1317-1323.
Robert S. Hixson et al., "Shock Compression Techniques for Developing Multiphase Equations of State", Los Alamos Science, No. 28, Jan. 2003, pp. 114-119.
Thomas S. Duffy et al., "Compressional sound velocity, equation of state, and constitutive response of shock-compressed magnesium oxide", Journal of Geophysical Research, vol. 100, No. B1, pp. 529-542, Jan. 10, 1995.
V.V. Prut et al., "Metallic Z-pinch method: the isentropic compression of hydrogen", JETP Lett. vol. 29, No. 1, Jan. 5, 1979, pp. 30-33.
W. J. Nellis et al., "Equation of state of shock-compressed liquids: Carbon dioxide and air", J. Chem. Phys., vol. 95 (7), Oct. 1, 1991, pp. 5268-5272.
Bellan, P.M., "Spheromaks: A practical applicationo f magnetohydrodynamic dynamos and plasma self-organization," Imperial College Press, 2000, pp. 1-9, 268-275.
Logan, B.G., et al., "Compact Torus Accelerator Driven Inertial Confinement Fusion Power Plant HYLIFE-CT," Lawrence Livermore National Laboratory, UCRL-TR-211025, Apr. 1, 2005, in 85 pages.
A. Prosperetti, "No Nuclear Fusion' from glowing bubbles", http://ci.mond.org/9708/970810.html.
A. Takahashi, "comments on work on sonofusion of D in acetone", http://www.cf.ale.iwateu.ac.jp/jcf/mlist00042.html.
items 116, 122 (Bohm, Quantum Theory) pp. 277-281.
Brenner et al, "Single-bubble Sonoluminescence", Reviews on Modern Physics, Apr. 2002, vol. 74, pp. 425-484.
Browne, New York Times, Dec. 1994.
C. W. Hartman et al, "A Compact Torus Fusion Reactor Utilizing a Continuously Generated String of CT's. The CT String Reactor", CTSR Journal of Fusion Energy (2008), Nov. 2, 2007, vol. published online, Issue 27, pp. 44-48.
C. W. Hartman et al, "Acceleration of Spheromak Toruses, Experimental results and fusion applications", OSTI ID: 5240480; DE90005312, Proceedings of 11th US/Japan workshop on field-reversed configurations and compact toroids; Nov 7-9, 1989, Dec. 1, 1989, Los Alamos, NM, USA.
C.W. Hartman et al., "Acceleration of Compact Toruses and Fusion Applications", Workshop on Physics of Alternative Magnetic Confinement Schemes, UCRL-JC-106121 Preprint, Oct. 11, 1990, Issue UCRL-JC-106121 Prepr, Varenna, Italy.
D. Bohm, "Quantum Mechanics", Dover Ed, 1989, pp. 277-281.
D. Braaten, "Ridiculously easy' test yields claim of energy triumph", Washington Times, Mar. 24, 1989.
Fortov, V., "Nonideal plasma under extreme conditions generated by shock waves", Plasma Phys. Control, 2003, vol. Fusion, Issue 45, pp. A1-A6.
G. Pusch, "Why is acetone used in sonofusion experiments?", website http://www.physics-talk.com.
H. S. McLean et al, "Design and operation of a passively switched repetitive compact toroid plasma accelerator", Fusion Technology, May 1998, vol. 33, pp. 252-272.
I. Sample, "Science runs into trouble with bubbles", The Guardian, Mar. 21, 2004.
J. H. Degnan,et al, "Compression of compact toroids in conical-coaxial geometry", Fusion Technology, Mar. 1995, vol. 27, Issue 2, pp. 107-114.
J. H. Degnan,et al., "Compact toroid formation, compression, and acceleration", Phys. Fluids B, Aug. 1993, vol. 5 , Issue (8), pp. 2938-2958.
J. H. Hammer, et al, "Experimental demonstration of acceleration and focusing of magnetically confined plasma rings", Physical Review Letters, Dec. 19, 1988, vol. 61, Issue 25, pp. 2843-2846.
J. Wilson, "Hot Sounds", http://www.popularmechanic.com/science/research/12816666.html, Feb. 1, 1998.
J.D. Lawson, "Some Criteria for a Power Producing Thermonuclear Reactor", Proc. Phys. Soc, 1957, Issue B70, pp. 6-10.
K. Suslick, "Chemistry cast doubt on bubble fusion", Nuclear News, Sep. 2002.
Knief, R. A., Nuclear Engineering, Theory and Technology of Commercial Nuclear Power, Hemisphere Publishing Corp., pp. 640-643, 1992.
L. Bertolini, et al, "SHARP, a first step towards a full sized Jules Verne Launcher", Lawrence Livermore National Lab; OSTI ID: 10125664; Legacy ID: DE94007029 Report No. UCRL-JC—114041; CONF-9305233-2, May 1, 1993, Issue CONF-9305233-2.
L. Crum, "Sonoluminescence and Acoustic Inertial Confinement", Fifth International Symposium on Cavitation, Nov. 1-4, 2003, Osaka , Japan.
L. A. Artsimovich, "Controlled Thermonuclear Reactions", Gordon & Breach, 1964, pp. 1-9, New York , USA.
Moss et al, "The Physics of Fluids", 1994, vol. 6, Issue (9), pp. 2979-2985.
"Star in a Jar", Popular Science, Dec. 1998.
R. E. Peterkin, Jr. "Direct electromagnetic acceleration of a compact toroid to high density and high speed", Physical Review Letters, Apr. 17, 1995, vol. 74, Issue 16, pp. 3165-3168.
R. L. Miller and R. A. Krakowski, "Assessment of the slowly-imploding liner (LINUS) fusion reactor concept", Los Alamos Scientific Laboratory, Oct. 1980, Issue Rept. No. LA-UR-80-3, Los Alamos, NM, USA.
R. Siemon, et al., "The Relevance of Magnetized Target Fusion (MTF) to practical energy production", A white paper for consideration by the fusion community and the Fusion Energy Scientific Advisory Committee, Jun. 3, 1999, Draft 2.
R. W. Moir et al., "HYLIFE-II: An approach to a long-lived, first-wall component for inertial fusion power plants", Lawrence Livermore National Lab, Aug. 1, 1994, vol. Report No. UCRL-J, Issue CONF-940933-46.
S. Putterman, "Sonoluminescence: Sound into Light", Scientific American, Feb. 1995, pp. 45-51.

(56) References Cited

OTHER PUBLICATIONS

Taleyarkhan et al, "Evidence for Nuclear Emissions During Acoustic Cavitation", Science, Mar. 8, 2002, vol. 295.

Thomas W. Kornack, "Magnetic Reconnection Studies on SSX", Swarthmore College Department of Physics and Astronomy, Jun. 10, 1998, pp. 2-56, Swarthmore, PA, USA.

H. P. Furth, "The Tokamak," in Fusion, vol. 1, Magnetic Confinement, Part A, ed. Edward Teller, Academic Press, pp. 123-242, 1981.

* cited by examiner

PRESSURE WAVE GENERATOR AND CONTROLLER FOR GENERATING A PRESSURE WAVE IN A LIQUID MEDIUM

CROSS-REFERENCE TO RELATED APPLICATIONS

This application is a continuation of U.S. patent application Ser. No. 11/072,963, filed Mar. 4, 2005, which is hereby incorporated by reference herein in its entirety. This application is related to U.S. patent application Ser. No. 11/073,276 by Laberge, filed Mar. 4, 2005, published as U.S. Patent Publication No. 2006/0198483, and incorporated herein by reference and to U.S. patent application Ser. No. 11/073,423 by Laberge filed Mar. 4, 2005, published as U.S. Patent Publication No. 2006/0198487, and incorporated herein by reference.

BACKGROUND

Field

This invention relates to nuclear fusion reactors and more particularly to pressure wave generation in nuclear fusion reactors.

Description of Related Art

Nuclear fusion reactions involve bringing together atomic nuclei against their mutual electrostatic repulsion and fusing them together to make heavier nuclei, while at the same time releasing energy. Isotopes of light elements (i.e., elements having a relatively small number of protons) are the easiest to fuse, because the electrostatic repulsion between the nuclei of light elements is smaller than that of heavier elements. The use of light elements may produce significantly reduced collateral radioactivity than comparable fission reactors, which typically use isotopes of heavier elements.

Inducing nuclear fusion reactions is difficult, because of the energies required to accelerate the nuclei to speeds fast enough to overcome their mutual electrostatic repulsion and because the nuclei are so small that the chance that two passing nuclei will interact with one another in a manner which results in fusion of the nuclei is small.

Fusion reactors typically require input energy to initiate fusion reactions. The amount of input energy required is largely determined by the need to accelerate the nuclear reactants to thermonuclear speed and to confine the nuclear reactants in a space that allows them to interact. A reactor that consumes less energy than it produces is said to produce net energy. Such a reactor will have an efficiency ratio (the ratio of energy output to the energy input) greater that unity. The energy output of a fusion reactor is largely determined by the number of fusion reactions that are induced in the reactor and the amount of energy that is released and captured.

There remains a need for methods and apparatus that facilitate improvements to the efficiency of nuclear fusion reactors.

SUMMARY OF THE INVENTION

In accordance with one aspect of the invention there is provided a method of operating a pressure wave generator in a system of pressure wave generators for generating a pressure wave in a liquid medium contained in a fusion reactor, wherein each pressure wave generator has a moveable piston and a control rod coupled thereto. The method includes causing the piston to be accelerated toward a transducer coupled to the liquid medium, by applying a motive force to the piston. The method further includes applying a restraining force to the control rod to cause the piston to impact the transducer at a desired time and with a desired kinetic energy such that the kinetic energy is converted into a pressure wave in the liquid medium.

Applying the motive force may involve applying a fluid pressure to the piston.

Causing the piston to be accelerated may involve applying a holding force to the control rod operable to hold the piston stationary while applying a fluid pressure to the piston.

The method may involve using a brake to apply the holding force.

Causing the piston to be accelerated may involve releasing a latch coupled to at least one of the control rod and the piston, the latch being operable to hold the piston stationary while applying a fluid pressure to the piston.

The method may include generating a position signal representing a position of the piston and applying the restraining force in response to the position signal.

Generating the position signal may involve generating a signal representing a position of the control rod.

Applying the restraining force may involve applying the restraining force in response to differences between positions of the piston and desired piston positions from a schedule of positions representing a desired piston position relative to time.

Applying the restraining force may involve increasing the restraining force when a position of the piston is ahead of a scheduled position and decreasing the restraining force when the position of the piston is behind the scheduled position.

Applying the restraining force may involve producing a restraining force in response to applying a transfer function to at least one of the differences.

The method may involve modifying the transfer function in response to at least one of the differences, such that respective differences in a subsequent operation of the piston are minimized.

In accordance with another aspect of the invention there is provided a pressure wave generator apparatus for use in a system of pressure wave generators for generating a pressure wave in a liquid medium contained in a fusion reactor. The apparatus includes a moveable piston, a control rod coupled to the piston, and a transducer coupled to the liquid medium. The apparatus further includes provisions for causing the piston to be accelerated toward the transducer, by causing a motive force to be applied to the piston and provisions for causing a restraining force to be applied the control rod to cause the piston to impact the transducer at a desired time and with a desired kinetic energy such that the kinetic energy is converted into a pressure wave in the liquid medium.

The provisions for causing the motive force to be applied may include provisions for applying a fluid pressure to the piston.

The apparatus may include provisions for causing a holding force to be applied to the control rod, the holding force operable to hold the piston stationary while applying a fluid pressure to the piston.

The apparatus may include provisions for generating a position signal representing a position of the piston.

The provisions for causing the restraining force to be applied to the control rod may be operably configured to cause the restraining force to be applied in response to the position signal.

The provisions for generating the position signal may include provisions for generating a signal representing a position of the control rod.

The provisions for causing the piston to be accelerated toward the transducer may include provisions for directing the piston toward a wall containing the liquid medium in the fusion reactor such that the piston impacts the wall and wherein the wall acts as the transducer coupled to the liquid medium, such that the impact of the piston against the wall causes a pressure wave to be generated in the liquid medium.

The apparatus may include provisions for guiding the piston toward the transducer.

The provisions for guiding may include provisions for at least partially evacuating air from movement path of the piston.

The provisions for guiding the piston may include a housing having an inside bore.

The apparatus may include provisions for generating an air cushion between the piston and the inside bore operable to reduce frictional forces between the piston and the bore.

The transducer may include provisions for impedance matching the transducer to the liquid medium.

The piston may include a face operable to impact a face of the transducer and the transducer may include provisions for reducing localized impact stresses between the face of the piston and the face of the transducer.

In accordance with another aspect of the invention there is provided a pressure wave generator apparatus for use in a system of pressure wave generators for generating a pressure wave in a liquid medium contained in a fusion reactor. The pressure wave generator apparatus includes a moveable piston, a control rod coupled to the piston and a transducer coupled to the liquid medium. The apparatus further includes a motive force generator for causing the piston to be accelerated toward the transducer and a brake for causing a restraining force to be applied the control rod to cause the piston to impact the transducer at a desired time and with a desired kinetic energy such that the kinetic energy is converted into a pressure wave in the liquid medium.

The motive force generator may include a housing for guiding the piston, the housing defining a first cavity behind the piston, the cavity having a fluid port for applying a fluid pressure to the cavity operable to accelerate the piston toward the transducer.

The housing may define a second cavity in front of the piston and may include a vacuum port in the second cavity operable to facilitate the acceleration of the piston by at least partially evacuating the second cavity.

The apparatus may include a brake for causing a holding force. to be applied to the control rod, the holding force operable to hold the piston stationary while applying a fluid pressure to the piston.

The apparatus may include a latch coupled to at least one of the control rod and the piston, the latch being operably configured to be released while fluid pressure is applied to the piston to permit the piston to accelerate under the fluid pressure.

The apparatus may include a position sensor for generating a position signal representing a position of the piston.

The control rod may include a plurality of indicia on a surface thereof and the position sensor may include an illuminator for directing a beam of light towards the indicia and a photodetector for generating a signal representing an intensity of light reflected from the indicia, such that when the piston is accelerated, movement of the control rod causes the photodetector to generate a signal of varying intensity representing the position of the control rod.

The brake may be operably configured to cause the restraining force to be applied in response to the position signal.

The brake may be operably configured to cause the restraining force to be applied in response to differences between positions of the piston and desired piston positions from a schedule of positions representing desired piston positions relative to time.

The brake may be operably configured to cause the restraining force to be increased when a position of the piston is ahead of a scheduled position and to cause the restraining force to be decreased when the position of the piston is behind the scheduled position.

The brake may be operably configured to cause the restraining force to be applied in response to applying a transfer function to the differences.

The apparatus may include a controller for modifying the transfer function in response to the differences, such that respective differences in a subsequent operation of the piston are minimized.

The motive force generator may be operably configured to direct the piston toward a wall containing the liquid medium in the fusion reactor such that the piston impacts the wall and wherein the wall acts as the transducer coupled to the liquid medium, such that the impact of the piston against the wall causes a pressure wave to be generated in the liquid medium.

The transducer may include a member mounted on a wall containing the liquid medium in the fusion reactor and wherein the pressure wave generator apparatus is coupled to the wall such that the piston is disposed to impact the member.

The apparatus may include a housing for guiding the moveable piston, the housing having an outside surface and an inside bore.

The outside surface may be operable to fit complementarily into an opening in a wall containing the liquid medium in the fusion reactor.

The piston may include a plurality of fluid orifices disposed between the piston and the inside bore of the housing, the orifices being operably configured receive pressurized fluid and to generate an air cushion between the piston and the inside bore for reducing frictional forces between the piston and the bore.

The brake may include an actuator and a brake pad operable to generate the restraining force by frictionally engaging a surface of the control rod in response to an actuation force applied by the actuator.

The actuator may include a piezoelectric material.

The brake may include a magnetic circuit operably configured to establish a magnetic field through the control rod thereby generating eddy currents in the control rod when the control rod moves with respect to the magnetic circuit, the generation of the eddy currents operable to apply the restraining force to the control rod.

The brake may include a magnetic fluid in contact with the control rod and a magnetic circuit operably configured to generate the restraining force by causing a magnetic field to be coupled through the magnetic fluid and the control rod.

In accordance with another aspect of the invention there is provided a method of generating a pressure wave for activating a fusion reaction in fusionable material in a liquid medium. The method involves causing pistons of respective ones of a plurality of pressure wave generators to be accelerated toward respective transducers coupled to the liquid medium, by applying respective motive forces to the pistons. The method also involves causing restraining forces to be applied to respective control rods connected to respective pistons to cause the respective pistons to impact the transducer at respective desired times and with respective desired amounts of kinetic energy such that the respective desired amounts of kinetic energy are converted into a pressure wave that converges toward the fusionable material in the liquid medium.

The method may include introducing fusionable material into the liquid medium.

The method may include locating the fusionable material in the liquid medium.

The method may include determining the desired times and the desired amounts of kinetic energy in response to a location of the fusionable material.

The method may include producing location signals representing a location of the fusionable material in the liquid medium.

The method may include producing release signals for causing the pistons to be accelerated and producing restraining signals for causing the restraining force to be applied to the control rods in response to the location signals.

The method may include receiving the release signals at actuators and causing the actuators to release the pistons for movement in response to the release signals.

The method may include receiving the restraining signals at brakes and causing the brakes to apply the restraining forces to the control rods in response to the restraining signals.

At least one of the desired times and desired kinetic energies may be determined in response to the location signals.

The method may include generating position signals representing positions of respective pistons and causing the restraining forces to be applied in response to the position signals and the location signals.

In accordance with another aspect of the invention there is provided a computer readable medium encoded with codes for directing a processor circuit to carry out the method and any of its variations above.

In accordance with another aspect of the invention there is provided a computer readable signal encoded with codes for directing a processor circuit to carry out the method and any of its variations above.

In accordance with another aspect of the invention there is provided an apparatus for generating a pressure wave for activating a fusion reaction in fusionable material in a liquid medium. The apparatus includes a plurality of pressure wave generators having respective moveable pistons, the pistons having respective control rods connected thereto. The apparatus also includes a plurality of transducers coupled to the liquid medium and provisions for causing the pistons of respective ones of the plurality of the pressure wave generators to be accelerated toward respective ones of the plurality of transducers. The apparatus further includes provisions for causing restraining forces to be applied to respective control rods to cause respective pistons to impact respective transducers at respective desired times and with respective desired amounts of kinetic energy such that the respective desired amounts of kinetic energy are converted into a pressure wave that converges toward the fusionable material in the liquid medium.

The apparatus may include provisions for causing fusionable material to be introduced into the liquid medium.

The apparatus may include provisions for locating the fusionable material in the liquid medium.

The apparatus may include provisions for determining the desired times and the desired amounts of kinetic energy in response to a location of the fusionable material.

The apparatus may include provisions for producing location signals representing a location of the fusionable material in the liquid medium.

The provisions for causing the pistons to be accelerated may include motive force generating provisions for generating forces on the pistons in respective directions of desired movement of the respective pistons and holding provisions for holding the piston stationary while the forces are applied.

The apparatus may include provisions for producing release signals operable to be received by the holding provisions and the holding provisions being responsive to the release signals to release the pistons to cause the pistons to be accelerated in response to the forces generated by the motive force generating provisions and the apparatus may further include provisions for producing restraining signals to cause the restraining force to be applied to the control rods in response to the location signals.

The apparatus may include provisions for generating position signals representing positions of respective pistons to cause the restraining forces to be applied in response to the position signals and the location signals.

The provisions for causing restraining forces to be applied may be operably configured to determine at least one of the desired times and desired kinetic energies in response to the location signals.

In accordance with another aspect of the invention there is provided an apparatus for generating a pressure wave for activating a fusion reaction in fusionable material in a liquid medium. The apparatus includes a plurality of pressure wave generators having respective moveable pistons, the pistons having respective control rods connected thereto. The apparatus further includes a plurality of transducers coupled to the liquid medium and a plurality of motive force generators for causing the pistons of respective ones of the plurality of the pressure wave generators to be accelerated toward respective ones of the plurality of transducers. The apparatus also includes a plurality of brakes for causing restraining forces to be applied to respective control rods to cause respective pistons to impact respective transducers at respective desired times and with respective desired amounts of kinetic energy such that the respective desired amounts of kinetic energy are converted into a pressure wave that converges toward the fusionable material in the liquid medium.

The apparatus may include an aperture for causing fusionable material to be introduced into the liquid medium.

The apparatus may include a fusionable material locating system operable to locate the fusionable material in the liquid medium.

The apparatus may include a controller for determining the desired times and the desired amounts of kinetic energy in response to a location of the fusionable material.

The apparatus may include location sensors for producing location signals representing a location of the fusionable material in the liquid medium.

The motive force generators may be operably configured to generate forces on the pistons in respective directions of desired movement of the respective pistons and the apparatus may include a brake for holding the piston stationary while the forces are applied.

The apparatus may include a controller for producing release signals operable to be received by the brakes, the brakes being responsive to the release signals to release the pistons to cause the pistons to be accelerated in response to the forces generated by the motive force generators the brakes operable configured for producing restraining signals to cause the restraining force to be applied to the control rods in response to the location signals.

The apparatus may include position sensors for generating position signals representing positions of respective pistons to cause the restraining forces to be applied in response to the position signals and the location signals.

The controller for causing restraining forces to be applied may be operably configured to determine at least one of the desired times and desired kinetic energies in response to the location signals.

The apparatus may include a plurality of location sensors operably configured to produce ultrasonic beams and to receive reflections of the ultrasonic beams, the reflections of the ultrasonic beams representing an alignment of respective ones of the pressure wave generators.

In accordance with another aspect of the invention there is provided a method of operating a pressure wave generator in a system of pressure wave generators for generating a pressure wave in a liquid medium contained in a fusion reactor. The method includes causing a moving piston having kinetic energy to impact a moveable transducer coupled to the liquid medium and converting at least a portion of the kinetic energy into a pressure wave in the liquid medium such that said pressure wave envelopes and converges on a fusionable material in the liquid medium.

In accordance with another aspect of the invention there is provided a pressure wave generator apparatus for use in a system of pressure wave generators for generating a pressure wave in a liquid medium contained in a fusion reactor. The apparatus includes a moveable piston, a moveable transducer coupled to the liquid medium and provisions for causing the piston having kinetic energy to impact the transducer. The apparatus also includes provisions for converting at least a portion of the kinetic energy into a pressure wave in the liquid medium, the pressure wave operable to envelope and converge on a fusionable material in the liquid medium.

The apparatus may include provisions for guiding the piston toward the transducer.

The transducer may include provisions for impedance matching the transducer to the liquid medium.

The piston may include a face operable to impact a face of the transducer and wherein the transducer may include provisions for reducing localized impact stresses between the face of the piston and the face of the transducer.

In accordance with another aspect of the invention there is provided a pressure wave generator apparatus for use in a system of pressure wave generators for generating a pressure wave in a liquid medium contained in a fusion reactor. The apparatus includes a moveable piston, a moveable transducer coupled to the liquid medium and a motive force generator for causing the piston having kinetic energy to impact the transducer such that at least a portion of the kinetic energy is converted into a pressure wave in the liquid medium, the pressure Wave being formed such that it envelopes and converges on a fusionable material in the liquid medium.

The transducer may include a plurality of layers of materials having transmission properties, each material having different transmission properties, the materials being selected and arranged in the layers such that the transducer is generally impedance matched to the liquid medium.

The transducer may include a member mounted on a wall containing the liquid medium in the fusion reactor and wherein the pressure wave generator apparatus is coupled to the wall such that the piston is disposed to impact the member.

The apparatus may include a housing having an outside surface and an inside bore, the inside bore operable to guide the piston toward the transducer.

The outside surface may be operable to fit complementarily into an opening in a wall containing the liquid medium in the fusion reactor.

The housing may include a first area defined by a first wall portion operably configured to hold the transducer in a position in which it will be impacted by the piston.

The transducer may include a member having an outside surface having a first portion defining a shape complementary to the first wall portion.

The housing may include a first area defined by a first wall portion having a first inside diameter and wherein the housing has a second area defined by a second wall portion having a second inside diameter and wherein the housing has a third area defined by a tapered third wall portion located between the first and second wall portions, the first wall portion being operable to guide the piston and the second and third wall portions being operable to hold the transducer.

The transducer may include a member having an outside surface having first and second portions defining a shape complementary to the second and third wall portions of the housing.

The first inside diameter may be less than the second inside diameter.

The piston may include a face operable to impact a face of the transducer and the transducer may include a conformal member for reducing localized impact stresses between the face of the piston and the face of the transducer.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Commonly owned U.S. patent application Ser. No. 10/507,323, filed on Mar. 12, 2002 is incorporated herein by reference and describes the construction and operation of a fusion reactor.

Figure 1:
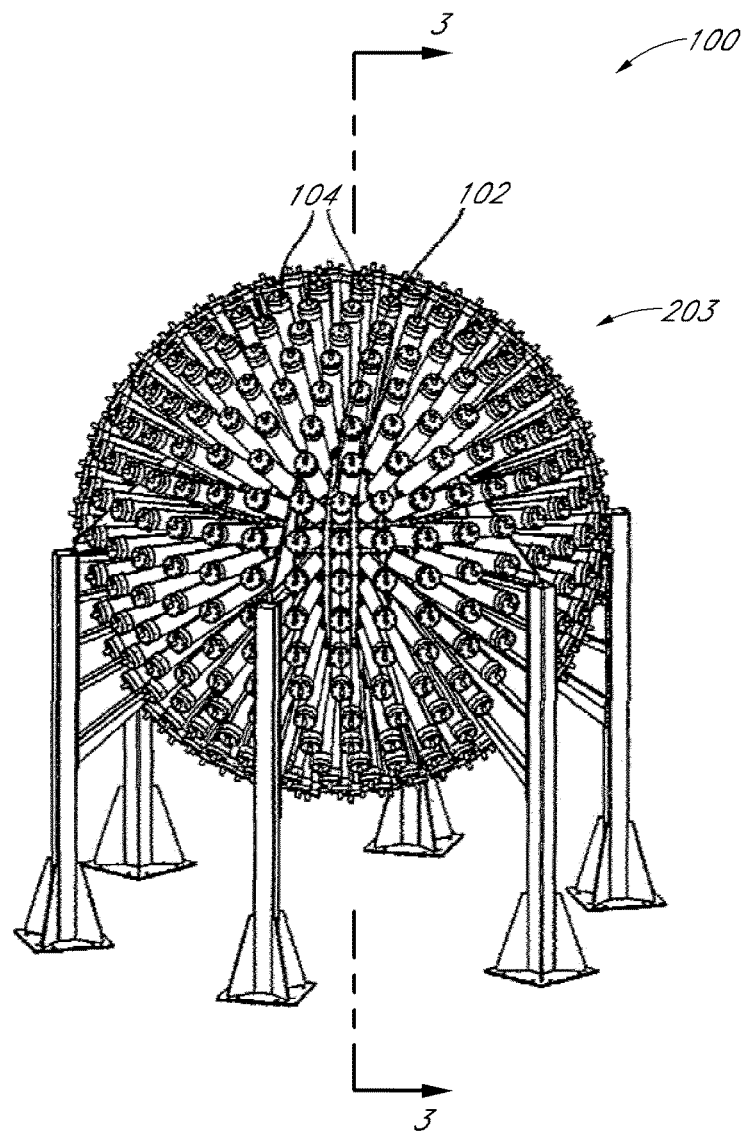
FIG. 1 is a perspective view of a fusion reactor according to a first embodiment of the invention.
Figure 2:
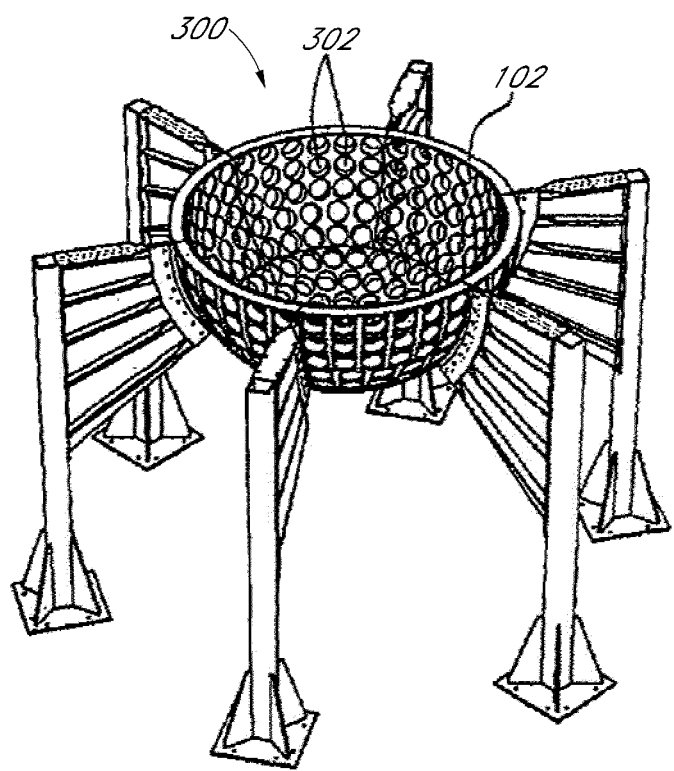
FIG. 2 is a perspective view of a portion of the fusion reactor shown in FIG. 1.

Referring to FIG. 1, a fusion reactor according to a first embodiment of the invention is shown generally at 100. The fusion reactor 100 includes a wall 102 and a plurality of radially oriented pressure wave generators 104, symmetrically arranged around an exterior of the wall. Referring to FIG. 2, in one embodiment, the wall 102 of the fusion reactor 100 may include a lower hemispherical shell 300 including a plurality of openings 302. The wall 102 of the fusion reactor 100 may also include a complimentary upper hemispherical shell shown at 203 in FIG. 1.

Figure 3:
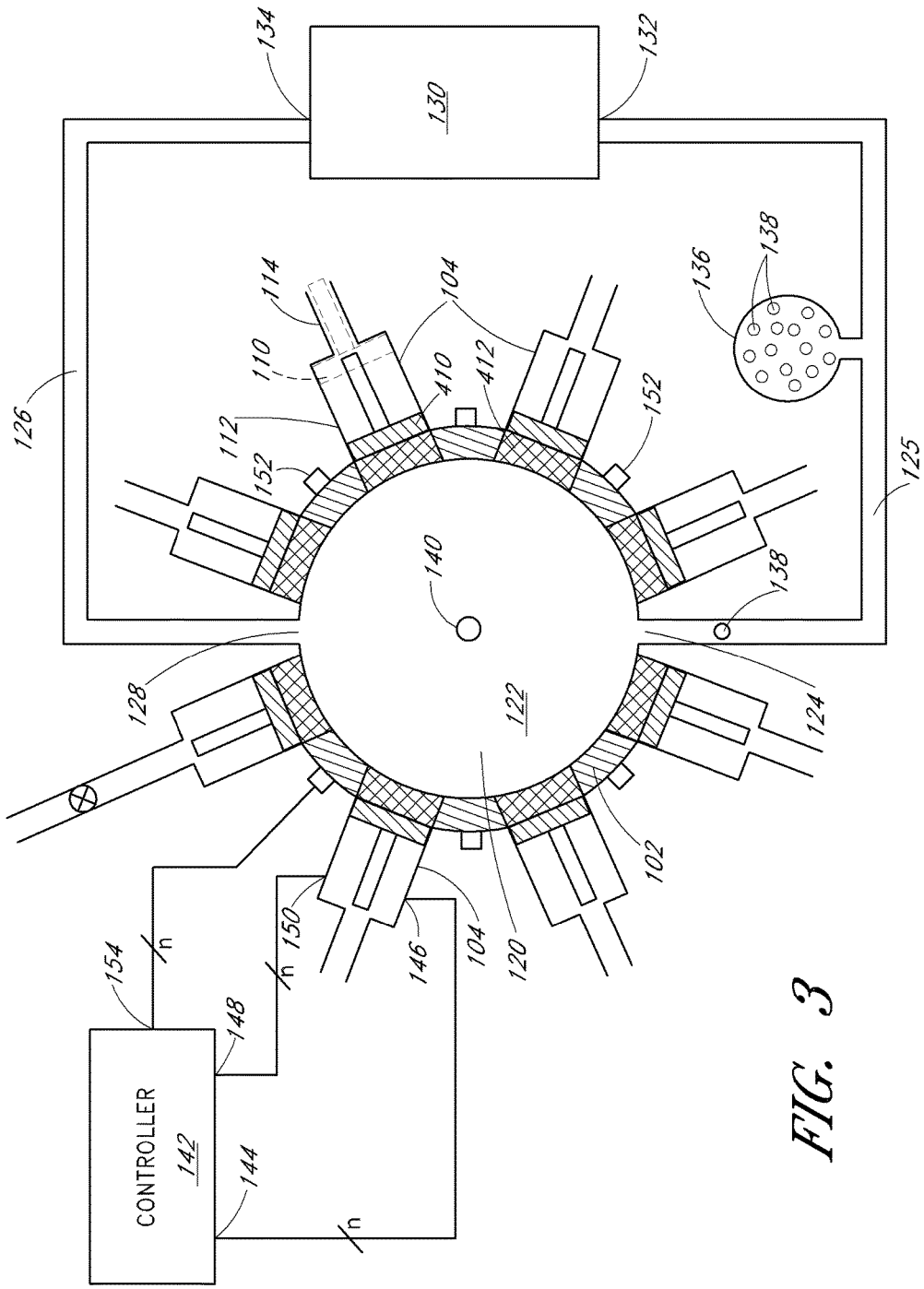
FIG. 3 is a cross-sectional view of the fusion reactor shown in FIG. 1 taken along line 3-3.

Referring to FIG. 3, the wall 102 of fusion reactor 100 defines an inner cavity 122 for containing a liquid medium 120. The liquid medium 120 may be a molten metal, such as lead, lithium, or sodium, or an alloy of such metals, and may be maintained under pressure (when the liquid is lithium the pressure may be in the region of 100 bar). The liquid medium 120 may also contain additives that enhance the properties thereof, for example by enhancing neutron shielding or increasing the density of the liquid medium.

The wall 102 of the fusion reactor 100 further includes an inlet aperture 124 and an outlet aperture 128 disposed on diametrically opposite sides of the reactor. The fusion reactor 100 also includes an inlet conduit 125 in communication with the inlet aperture 124 and an outlet conduit 126 in communication with the outlet aperture 128. The fusion reactor 100 further includes a recirculation system 130, which includes an input 134 in communication with the outlet conduit 126 and an output 132 in communication with the inlet conduit 125. The recirculation system 130 also includes a pump (not shown) for circulating the liquid medium 120 through the fusion reactor 100 and may also include facilities for maintaining the liquid medium at a desired temperature by extracting heat. The recirculation system 130 may also include a turbine (not shown) for converting the heat into electrical energy.

The fusion reactor 100 also includes a reservoir 136, in communication with the inlet conduit 125, for holding fusionable material 138 and for introducing the fusionable material 138 into the liquid medium 120 through the inlet conduit 125. The fusionable material 138 may be in a gaseous form and may include an isotope of a light element, such as deuterium, tritium, 3He, or a combination thereof. The fusionable material 138 may also include an encapsulating wall which may include glass, plastic or other suitable materials.

The fusion reactor 100 further includes a controller 142, which may include a locating system (not shown) for locating a fusionable material target 140 within the liquid medium 120. The locating system includes a plurality of position sensors 152 located on the wall 102 of the fusion reactor 100. The position sensors 152 may include ultrasonic transceivers having inputs for receiving an excitation pulse that causes the ultrasonic transceiver to transmit an ultrasonic pulse that couples through the wall 102 into the liquid medium 120. The ultrasonic transceivers may also include outputs that produce location signals in response to a received reflection from a fusionable material target 140. The controller 142 includes a plurality of inputs 154 for receiving location signals from the transceivers.

The controller 142 further includes a plurality of inputs 148, coupled to respective outputs 150 of the pressure wave generators 104 and a plurality of outputs 144 coupled to respective inputs 146 of the pressure wave generators 104. The controller 142 is described in greater detail below.

The pressure wave generators 104 include a moveable piston 410, a transducer 412 and a motive force generator 112 for accelerating the piston from an initial position 110 (shown in broken outline) to impact the transducer 412. The motive force generator 112 may include a cylinder and a fluid inlet 114 for applying a fluid pressure to the piston to generate the motive force. In this embodiment the transducer 412 is slideably received in an opening 302 in the wall 102 and is capable of being displaced radially relative to the wall 102 by the impact of the piston 410. In other embodiments the transducer includes a portion of the wall 102 that may be directly impacted by the piston 410.

Figure 4:
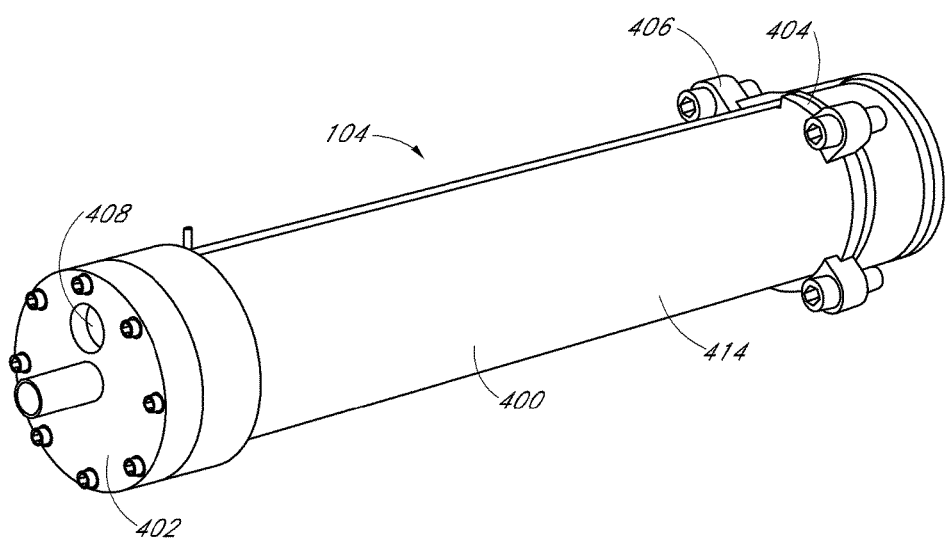
FIG. 4 is a perspective view of a pressure wave generator used in the fusion reactor shown in FIG. 1.

Referring to FIG. 4, the pressure wave generator 104 is shown in greater detail. The pressure wave generator 104 includes a housing 400 and an end cap 402. The end cap 402 includes a fluid port 408 for applying fluid pressure to the pressure wave generator 104. The housing 400 includes an outside surface 414 that is dimensioned to fit complementarily in one of the plurality of openings 302 (shown in FIG. 2). The pressure wave generator 104 further includes a flange 404 and a plurality of clamps 406 for mounting the pressure wave generator on the wall 102 of the fusion reactor 100.

Figure 5:
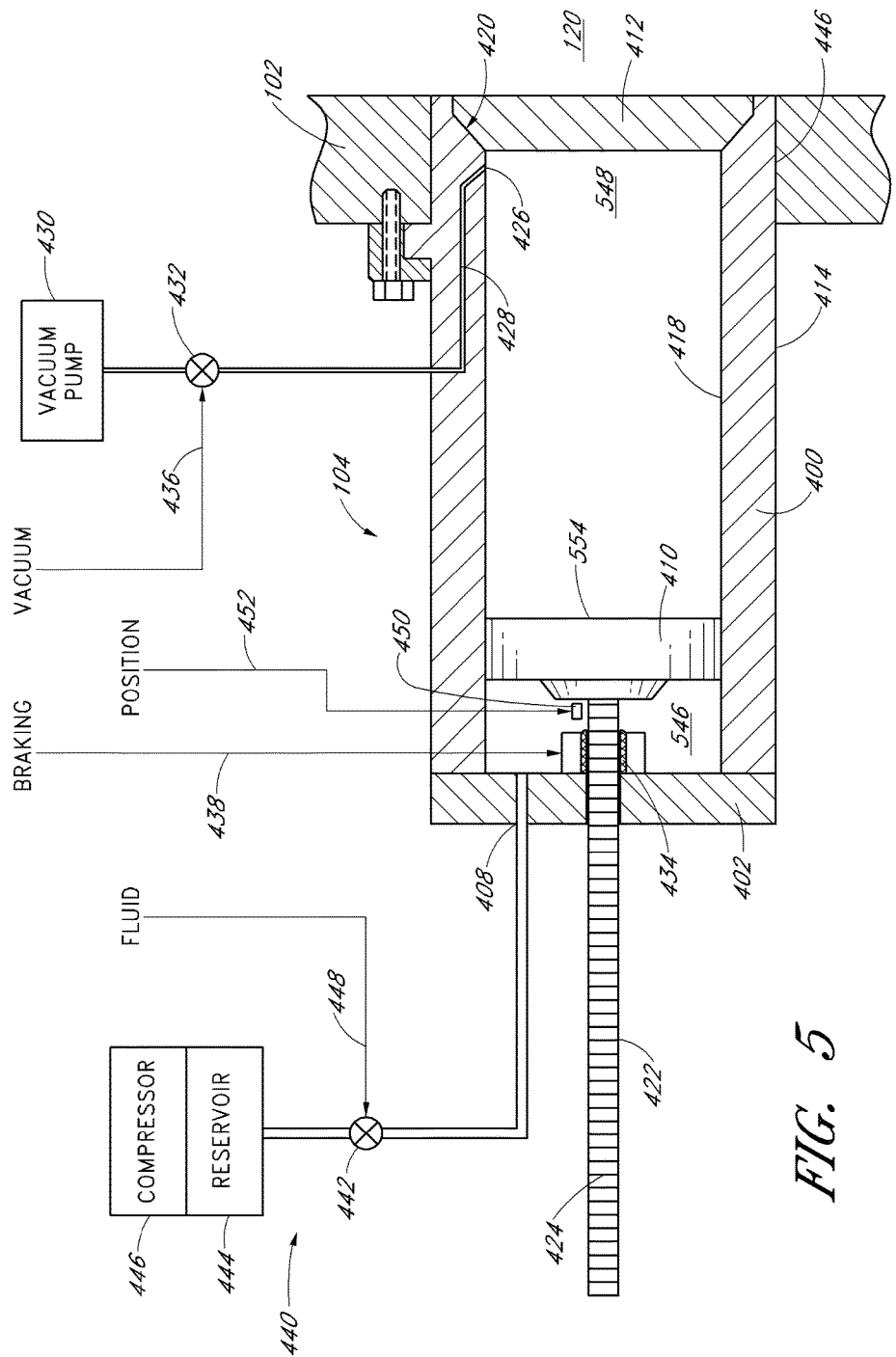
FIG. 5 is a cross-sectional view of the pressure wave generator shown in FIG. 4.

Referring to FIG. 5, the pressure wave generator 104 is shown in a sectional view. The housing 400 of the pressure wave generator 104 includes an inside bore 418 for accommodating the moveable piston 410. The housing 400 further includes a wall portion 420 for holding a transducer 412. The transducer 412 is in contact with and coupled to the liquid medium 120, thus facilitating the exchange of energy between the transducer and the liquid medium.

Figure 20:
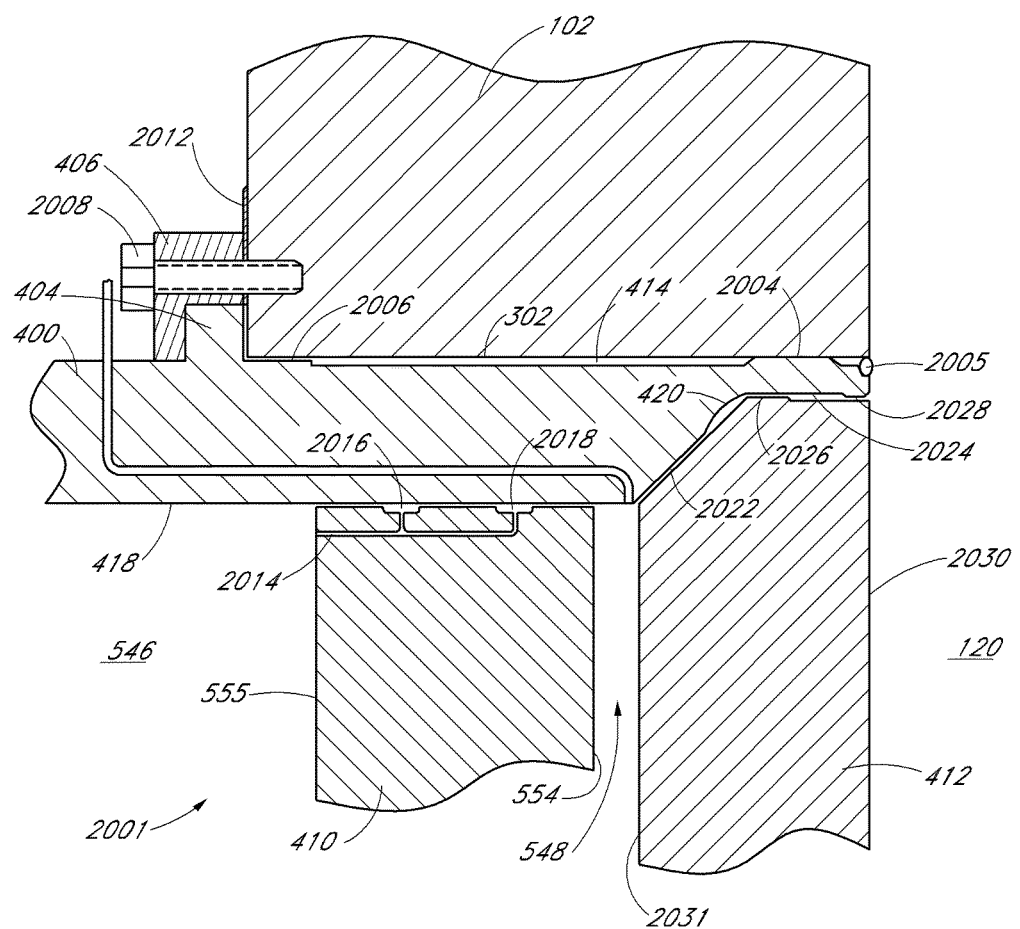
FIG. 20 is a detailed cross-sectional view of a portion of the pressure wave generator shown in FIG. 4.

Referring to FIG. 20, the piston 410, the transducer 412, and the housing 400 of the pressure wave generator 104 are shown in greater detail at 2001. The housing 400 includes annular guides 2004 and 2006 for locating the pressure wave generator 104 in one of the openings 302 in the wall 102 (shown in FIG. 2) of the fusion reactor 100. The housing 400 also includes a metal seal 2005 for ensuring that the liquid medium 120 does not leak out of the vessel around the pressure wave generator 104. The pressure wave generator 104 includes a fastener 2008 for clamping the pressure wave generator to the wall 102 using the clamps 406 and the flange 404. The positioning of the pressure wave generator 104 within the opening 302 may be adjusted by introducing shims 2012 between the flange 404 and the vessel wall 102. The shims 2012 may be used to adjust the longitudinal position of the pressure wave generator 104 in the opening 302 as well as to aim the pressure wave generator toward the center of the inner cavity 122.

The piston 410 (shown near the end of its travel along the bore 418) includes a conduit 2014 in communication with a cavity 546 and a pair of orifices 2016 and 2018, located between the bore 418 and the piston 410. The piston 410 includes a plurality of such conduits (only one shown) located around the circumference of the piston 410. The piston 410 also includes an impact surface 554 and a rear surface 555.

The wall portion 420 of the housing 400 includes a tapered wall portion 2022 and bore 2024. The transducer 412 is complementarily shaped to be slideably accommodated in the wall portion 420 and includes an annular guide 2026 for contacting the bore 2024 and providing a sliding fit therewith. The wall portion 420 of the housing 400 also includes a protruding lip 2028 for preventing the transducer 412 from becoming dislodged from the housing. The transducer 412 also includes an impact surface 2031 and an outer surface 2030.

Returning again to FIG. 5, the piston 410 includes a control rod 422 coupled to the piston, and projecting rearwardly through the end cap 402. The control rod 422 includes indicia comprising a plurality of regularly spaced marks 424, inscribed on a surface of the control rod.

The housing 400 also includes a vacuum orifice 426 in communication with a vacuum conduit 428. The vacuum conduit 428 is connected to a vacuum pump 430 through a vacuum control valve 432. The vacuum control valve 432 is electrically actuated by a vacuum control signal coupled to the valve by the signal line 436.

The pressure wave generator 104 also includes a pressurised fluid supply 440, including a compressor 446 for providing pressurised fluid (such as compressed air), a reservoir 444 for storing pressurised fluid and a regulator 442 for regulating the flow of the pressurised fluid. The regulator 442 is controlled by a fluid control signal coupled to the regulator by the signal line 448 and facilitates applying and removing fluid pressure to the pressure wave generator 104 through the fluid port 408. The regulator 442 further includes facilities for adjusting a pressure level of the fluid pressure applied to the pressure wave generator 104.

In this embodiment the pressure wave generator 104 also includes a brake 434 connected to the end cap 402. The brake 434 is electrically actuated by a braking control signal coupled to the brake by line 438.

Figure 9:
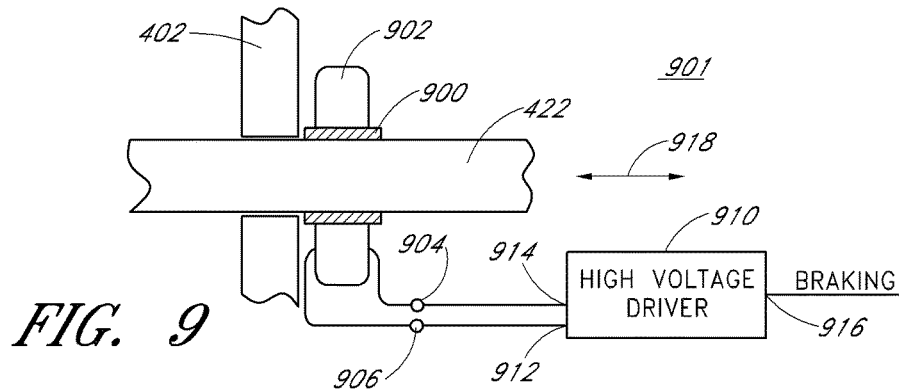
FIG. 9 is a cross-sectional view of an embodiment of a brake for implementing the pressure wave generator of FIG. 4.
Figure 10:
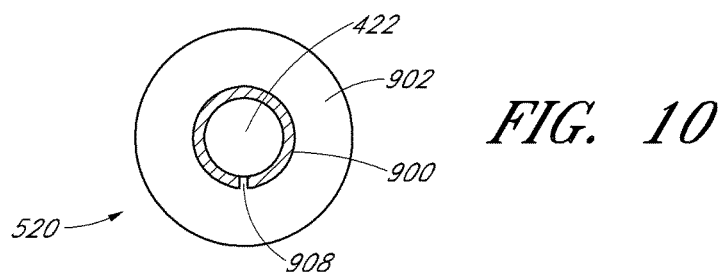
FIG. 10 is a plane view of the brake shown in FIG. 9.

Referring to FIG. 9 and FIG. 10, an embodiment of a brake is shown generally at 901. The brake 901 includes a brake pad 900, an annular piezoelectric actuator 902 and a high voltage driver 910. The brake pad 900 almost completely encircles the control rod 422 except for a narrow gap 908. The piezoelectric actuator 902 surrounds the brake pad 900. The piezoelectric actuator 902 includes electrical input terminals 904 and 906. The high voltage driver 910 includes an input terminal 916 for receiving a braking control signal and a pair of output terminals 912 and 914 for producing a high voltage drive signal.

In operation, the high voltage driver 910 receives a braking control signal at the input terminal 916 and produces a proportional high voltage drive signal at the output terminals 912 and 914. The piezoelectric actuator 902 applies a radially inwardly directed force to the brake pad 900 in response to the high voltage drive signal applied to the input terminals 904 and 906. The radially inwardly directed force causes a frictional force to be applied to the control rod 422, restraining, or preventing movement in directions indicated by the arrow 918.

Figure 11:
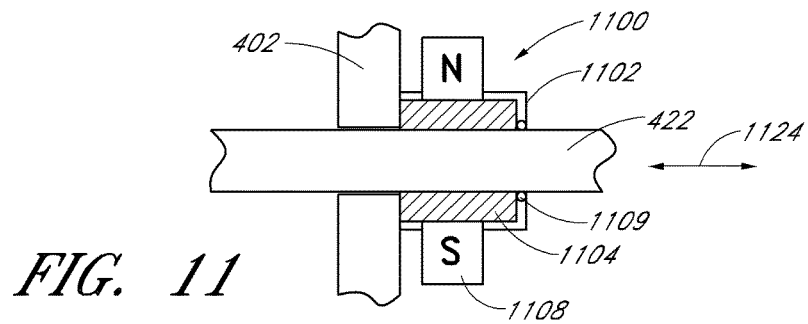
FIG. 11 is a cross-sectional view of another embodiment of a brake for implementing the pressure wave generator of FIG. 4.
Figure 12:
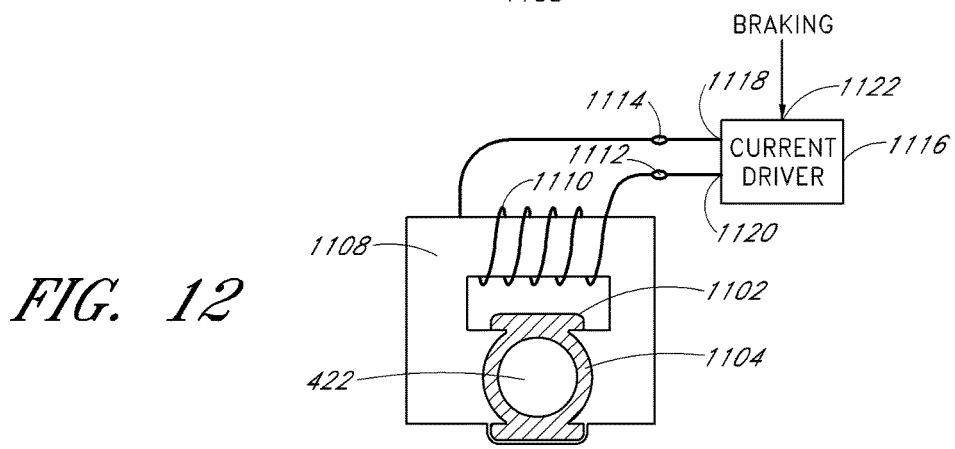
FIG. 12 is a plane view the brake shown in FIG. 11.

Referring to FIG. 11 and FIG. 12, an alternative embodiment of a brake is shown at 1100. The brake 1100 includes a magnetic core 1108, a magnetic fluid 1104 and a housing 1102 for containing the magnetic fluid. A coil 1110 is wound around the magnetic core 1108. The coil 1110 includes a pair of terminals 1112 and 1114 for receiving a drive current. The housing 1102 of the brake 1100 is situated in a gap in the magnetic core and includes a seal 1109, which facilitates free movement of the control rod 422 relative thereto, while preventing escape of the magnetic fluid 1104. Magnetic fluid is a composite which includes fine ferromagnetic particles, usually dispersed in a base liquid. In the absence of a magnetic field the fluid flows freely but when a magnetic field is applied the ferromagnetic particles align constraining the free flow. The brake 1100 further includes a current driver 1116 having an input terminal 1122 for receiving a braking control signal and having output terminals 1118 and 1120 for delivering a drive current to the terminals 1112 and 1114 of the coil 1110.

In operation, the current driver 1116 receives a braking control signal at the input terminal 1122 and produces a proportional drive current which is applied to the coil 1110 at the terminals 1112 and 1114. The current supplied to the coil 1110 establishes a magnetic field in a magnetic circuit defined by the magnetic core 1108, the magnetic fluid 1104, and the control rod 422. The magnetic field through the magnetic fluid 1104 causes the magnetic particles to align thus applying a restraining force to the control rod 422 in directions indicated by the arrow 1124. The amount of restraining, force applied is proportional to the current in the coil 1110.

Figure 13:
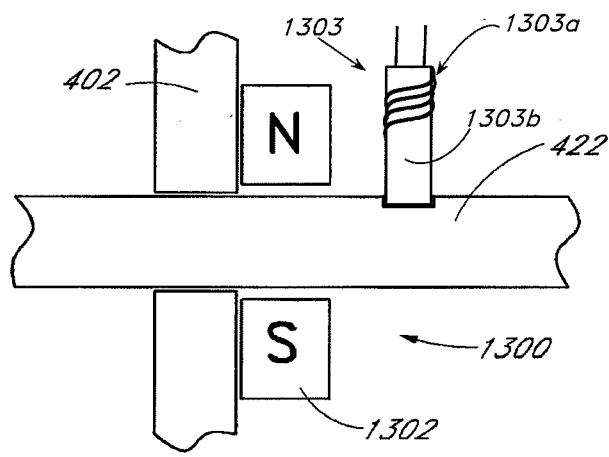
FIG. 13 is a cross-sectional view of yet another embodiment of a brake for implementing the pressure wave generator of FIG. 4.
Figure 14:
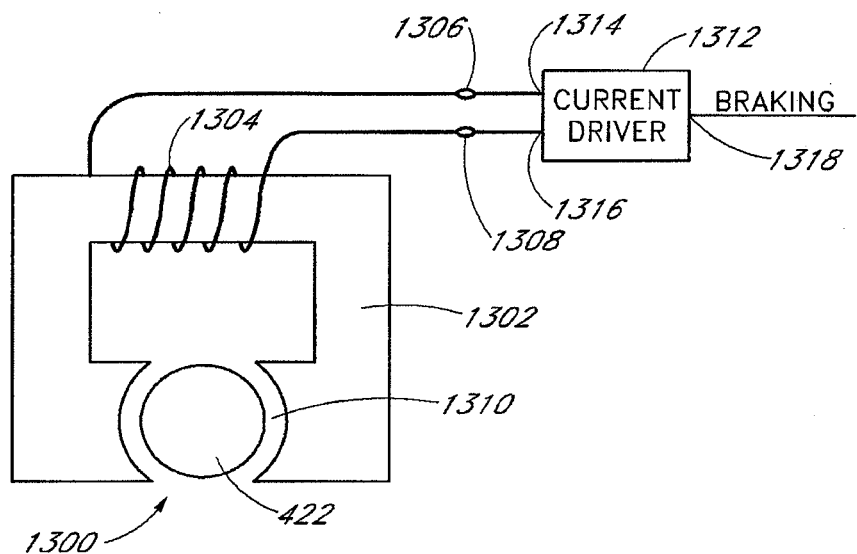
FIG. 14 is a plane view the brake shown in FIG. 13.

Another embodiment of a brake is shown in FIG. 13 and FIG. 14 at 1300. The brake 1300 includes a magnetic core 1302 and a coil 1304, wound around the magnetic core. The brake 1300 also includes an air gap 1310 in the magnetic core 1302 and the magnetic core 1302 is positioned such that the control rod 422 is moveably positioned in the air gap. The coil 1304 includes a pair of terminals 1306 and 1308 for receiving a drive current. The brake 1300 further includes a current driver 1312 having an input terminal 1318 for receiving a braking control signal and having a pair of output terminals 1314 and 1316 for delivering a drive current to the terminals 1306 and 1308 of the coil 1304.

In operation, the current driver 1312 supplies a current to the terminals 1306 and 1308 of the coil 1304 in response to the braking control signal received at the input 1318. The current in coil 1304 causes a magnetic field to be established in the magnetic core 1302. The magnetic field couples into the control rod 422, but negligible force is applied to the control rod while it is stationary. However, when the control rod 422 is moved, the magnetic field generates eddy currents in the material of the control rod, thus applying a restraining force to the control rod. The restraining force is proportional to the velocity of the control rod 422 and the current through the coil 1304. In this embodiment the brake 1300 is unable to apply a holding force to the control rod 422 when the control rod is stationary, requiring an additional latch 1303 to be provided for holding the piston 410 prior to firing. The latch 1303 may include an electromechanical solenoid 1303a that is electrically activated to remove a plunger 1303b holding either the piston 410 or the control rod 422.

Alternatively the holding force may be applied by a separate brake that applies a holding force to either the piston 410 or the control rod 422.

Returning now to FIG. 5, the pressure wave generator 104 further includes a position sensor 450, located proximate to the control rod 422. The position sensor 450 produces a position signal representing the position of the control rod 422 on the signal line 452.

Figure 15:
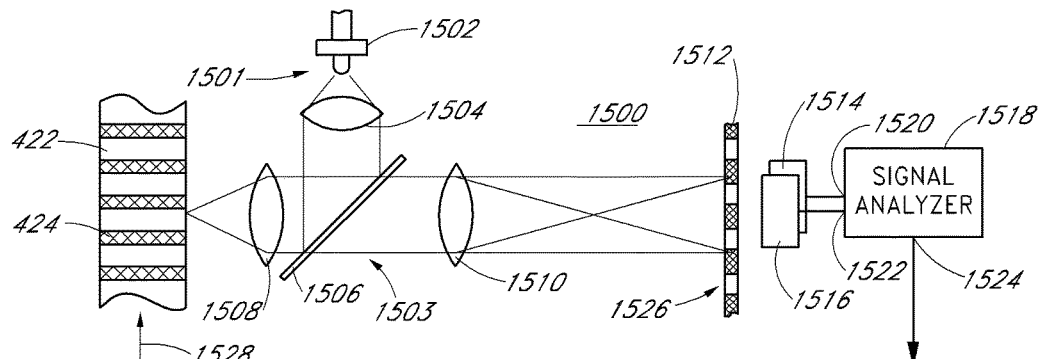
FIG. 15 is a schematic view of a position sensor for implementing the pressure wave generator of FIG. 4.
Figure 16:
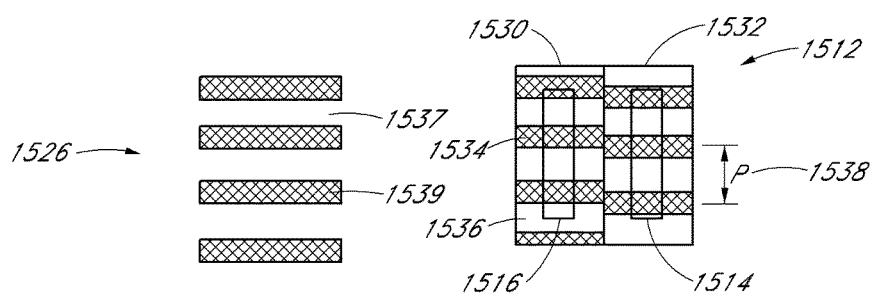
FIG. 16 is a plane view of a reticule of the position sensor shown in FIG. 15.

Referring to FIGS. 15 and 16, an embodiment of the position sensor 450 employing optical sensing techniques is shown at 1500. The position sensor 1500 includes an illuminator 1501, an imaging system 1503, a reticule 1512, a first photodetector 1516, and a second photodetector 1514. The illuminator 1501 includes a light emitting diode (LED) 1502, an illumination lens 1504 and a beamsplitter 1506. The imaging system 1503 includes a first imaging lens 1508 and a second imaging lens 1510.

The reticule 1512 is shown in greater detail in FIG. 16 at 1512. The reticule 1512 is divided to include a first region 1530 and a second region 1532. The regions 1530 and 1532 include a regular pattern of lines defined by a plurality of absorptive lines 1534 and a plurality of transmissive lines 1536. The lines are spaced apart by a pitch distance p indicated at 1538. The lines in the region 1530 are also offset from the lines in the region 1532 by one quarter of the spacing distance p. The first photodetector 1516 is positioned to measure a light intensity transmitted through the region 1530 of the reticule 1512 and the second photodetector 1514 is positioned to measure a light intensity transmitted through the region 1532 of the reticule 1512. The position sensor 1500 further includes a signal analyser 1518 having an input 1520 coupled to the second photodetector 1514 and an input 1522 coupled to the first photodetector 1516. The signal analyser 1518 also includes an output 1524 for producing a position signal.

The operation of the position sensor 1500 is described with reference to FIGS. 15, 16 and 17. Light Illumination from the LED 1502 is gathered by the illumination lens 1504 and directed onto the control rod 422 via the beamsplitter 1506 and the first imaging lens 1508. The beamsplitter 1506 is a partially silvered mirror that transmits some portion of the light and reflects the remaining light (usually 50%). The marks 424 on the control rod 422 reflect the illumination back through the first imaging lens 1508, the beamsplitter 1506, and the second imaging lens 1510 onto the reticule 1512, forming an image 1526 of the marks 424 at the plane of the reticule. The image 1526 includes a plurality of light areas 1537 alternating with a plurality of dark areas 1539, the light and dark areas corresponding to the marks 424 (for clarity the image 1526 is shown separated from the reticule 1512 in FIG. 16, but it should be understood that in operation the image impinges on the reticule). The second imaging lens 1510 is selected and positioned such that the spacing between the dark areas 1539 (and the light areas 1537) is substantially the same as the reticule line spacing p.

The image 1526, impinging on the reticule 1512, generates a Moire interference pattern at the reticule, i.e., when the light areas 1537 in the image 1526 line up with the absorptive lines 1534, in the region 1532 of the reticule 1512, very little light is transmitted through the reticule to the second photodetector 1514. However, when the control rod 422 is displaced in the direction shown by the arrow 1528, the image 1526 also moves and when the light areas 1537 in the image 1526 line up with the transmissive lines 1536 in the region 1532 of the reticule 1512, almost all of the light is transmitted through the reticule to the second photodetector 1514. For in-between alignments of the image 1526 and the lines of the reticule 1512, an attenuated beam of light is transmitted through the reticule. Movement of the control rod 422, thus results in a time varying light intensity being registered by the second photodetector 1514. Similarly movement of the control rod 422, results in a time varying light intensity being registered by the first photodetector 1516.

Figure 17:
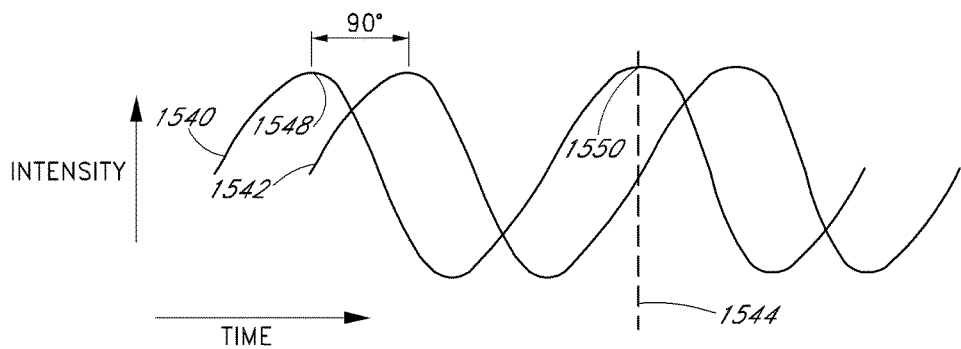
FIG. 17 is a schematic representation of signal waveforms produced by the position sensor of FIG. 15.

Referring to FIG. 17, the signals generated by the photodetectors 1514 and 1516 in response to the varying light intensity through the reticule 1512 are shown as a pair of periodic signals 1540 and 1542 respectively. The depicted signals 1540 and 1542 represent a specific case where the control rod 422 is moved at a constant velocity, although in practice the velocity of the control rod will not be constant, resulting in the signals having varying frequency. The signals 1540 and 1542 are offset in phase by 90 degrees due to the offset between the lines in the region 1530 and the region 1532 on the reticule 1512 (i.e., the signals 1540 and 1542 have a quadrature phase relationship). A change in position of the control rod 422 is represented as a change in intensity of the signals 1540 and 1542. The velocity of the rod may be calculated from the known spacing between the marks 424 on the control rod 422 and the time interval between a peak 1548 and a peak 1550 of the signal 1540. Either one of the signals 1540 or 1542 may be used to represent a change in the position of the control rod 422. However, either one of the signals 1540 and 1542 alone may not unambiguously indicate a direction of motion. The direction of motion may be determined by further analysing the quadrature signals 1540 and 1542. The signal analyser 1518 is configured to interpret the quadrature signals 1540 and 1542 to remove any possible ambiguity regarding the direction of motion. For example, if the control rod 422 reverses direction at a time indicated by the vertical line 1544, the signal 1540 will not indicate this change since the sinusoidal signal is at its peak 1550 and the intensity of the signal changes its direction of swing at this time, whether or not the direction of motion reverses. This creates an ambiguity that may be resolved by examining the signal 1542 at the time 1544. If the signal 1542 continues to increase in intensity past the time 1544, then the direction has not reversed. However should the signal 1542 start to reduce in intensity after the time 1544 then the direction of motion has unambiguously reversed.

In this embodiment, optical sensing techniques are used to generate the position signal, but other position sensing techniques such as fibre interferometry may also be employed.

Figure 6:
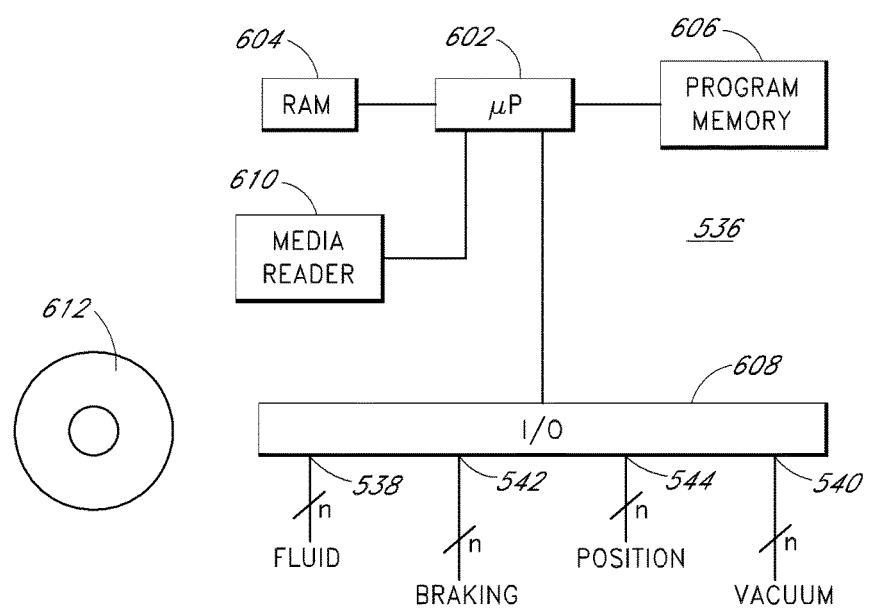
FIG. 6 is a block diagram of a processor circuit for implementing a controller for the pressure wave generator shown in FIG. 4.

Referring to FIG. 6 the controller 142 for controlling the plurality of pressure wave generators 104 may be implemented by a processor circuit shown generally at 536. The processor circuit 536 includes a processor 602, random access memory (RAM) 604, program memory 606, an input/output (I/O) interface 608, and a media reader 610, all in communication with the processor 602. The RAM 604 and the program memory 606 may, of course, be integrated within the processor 602 itself. In addition, the I/O interface 608 may also be integrated within the processor 602. The I/O interface 608 includes an input 544 for receiving a position signal. The I/O interface may include analog to digital (A/D) conversion circuitry (not shown) for converting analog position signals at the input 544 into digital signal representations thereof. The I/O interface 608 further includes outputs 538, 542 and 540 for producing the fluid control signal, the braking control signal and the vacuum control signal. Each of the outputs 538, 542 and 540 may include digital to analog (D/A) conversion circuitry (not shown) for converting digital signals received from the processor into analog signals, suitable for controlling the various actuators coupled to the outputs. The processor circuit 536 may include a plurality of inputs 544 and a plurality of outputs 538, 542 and 540 for controlling the plurality of respective pressure wave generators 104.

While the controller may be conveniently implemented using the processor circuit 536, the controller may also be implemented using custom designed analog circuitry or a mixture of analog and digital circuitry.

The operation of the fusion reactor 100 will now be explained with reference to FIG. 3. The recirculation system 130 establishes a flow of the liquid medium 120 between the inlet aperture 124 and the outlet aperture 128. The recirculation system also ensures that the liquid medium 120 is at a desired temperature. Fusionable material 138 is introduced from the reservoir 136 into the recirculating liquid medium 120 in the conduit 125 and caused to travel into the inner cavity 122 through the inlet aperture 124. The fusionable material target 140, comprising a quantity of the fusionable material 138, is transported upwards in the inner cavity 122 by its buoyancy and the flow of the liquid medium 120. While the target 140 is moving towards the center of the inner cavity 122, the locating system in the controller 142, is operable to determine a location of the target 140 in response to signals representing the location of the target produced by the position sensors 152. When the location system detects that the target 140 is proximate to the center of the inner cavity 122, the controller 142 initiates the firing of the pressure wave generators 104. A desired impact timing and desired kinetic energy is selected for each pressure wave generator 104 such that the contributions of energy generated by each pressure wave generator will cause a pressure wave to be generated in the liquid medium 120 that converges to the determined location of the target 140.

In the embodiment shown in FIG. 3, each pressure wave generator generates its contribution to the pressure wave by impacting the transducer 412. The transducer 412 is moveable and receives energy from the piston in the form of kinetic energy and converts that energy into a pressure wave in the liquid medium 120. The pressure wave envelopes and converges on the fusionable material target 140. If the pressure wave has sufficient amplitude and is sufficiently symmetrically focused on the target 140 when it reaches the target, the fusionable material will be compressed to an extent sufficient to increase the pressure and temperature of the fusionable material 138 contained therein to a level where nuclear fusion reactions are initiated.

Advantageously, the flow of liquid medium 120 between inlet aperture 124 and the outlet aperture 128 quickly transports the next fusionable material target to the center of the inner cavity 122. Each firing of the pressure wave generators 104 initiates fusion reactions, which in turn generates heat. The heat may be extracted by the recirculation system 130 and used to generate electrical power.

In other embodiments the transducer may comprise a portion of the wall 102 and the piston 410 may impact the portion of the wall 102 directly, thus transferring the kinetic energy of the piston 410 to the exterior of the wall. The impact causes a compression wave in the wall portion and also elastically displaces the portion of the wall causing the kinetic energy to be converted into a pressure wave at the interior of the wall, where the wall is coupled to the liquid medium 120 due to its contact therewith.

In the operation of the fusion reactor 100, it is desirable that the pressure wave symmetrically converge on target 140 from all sides. Any asymmetry in the pressure wave may allow the target 140 to distort, which may result in a corresponding decrease of the maximum temperature and pressure achieved. Consequently, it may be important that the operation of the pressure wave generators 104 be precisely controlled, which may involve synchronising the firing of the pressure wave generators 104. Alternatively, the determined location of the target 140 may be utilized to control the firing of the pressure wave generators 104, such that the pressure wave converges to the location of the target 140, which may not be exactly at the center of the inner cavity 122. The desired impact timing and desired amount of kinetic energy for each piston may also be selected in order to account for minor mechanical differences between the pressure wave generators 104.

The operation of the pressure wave generators 104 will now be described in greater detail with reference to FIGS. 5, 6, 7 and 8. In preparation for firing the pressure wave generators 104, the compressor 446 and the vacuum pump 430 are activated. The compressor 446 pressurises the reservoir 444, which in turn provides actuating energy for the pressure wave generators 104. The reservoir 444 may permit storage of sufficient energy, in the form of compressed fluid, to actuate a plurality of the pressure wave generators 104 simultaneously or to actuate one or more pressure wave generators several times in succession.

Figure 7:
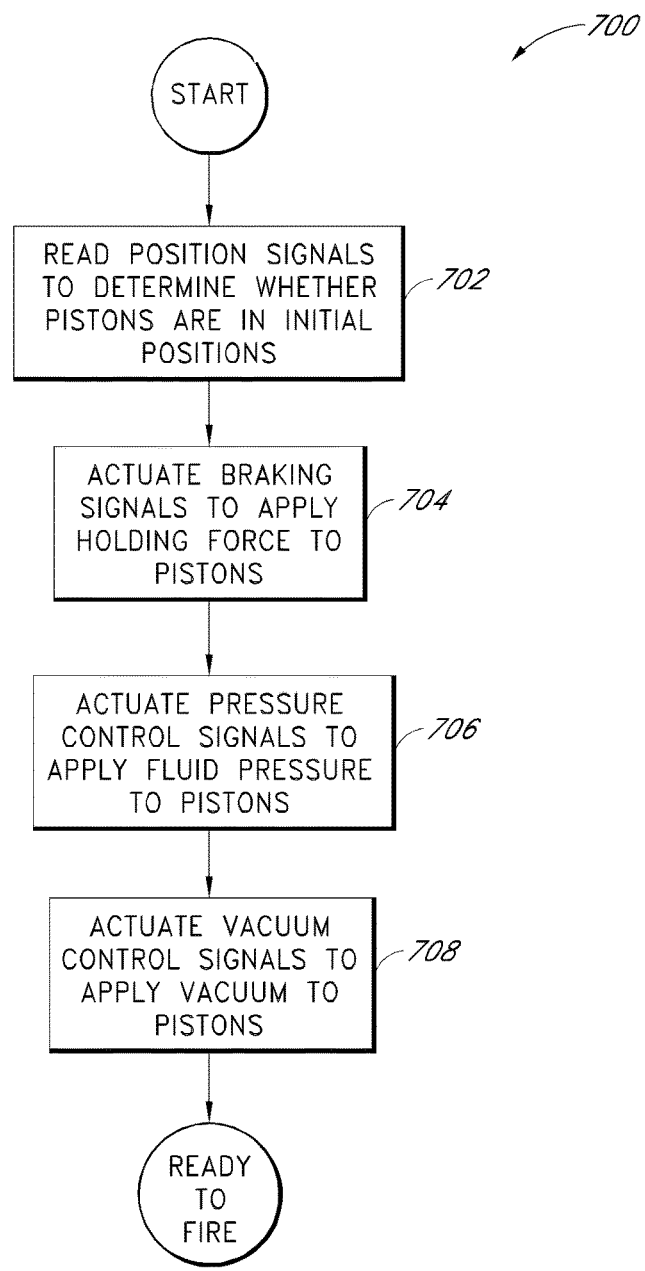
FIG. 7 is a flowchart of codes executed by the processor circuit of FIG. 6 to implement a controller for initializing the pressure wave generator shown in FIG. 4.
Figure 8:
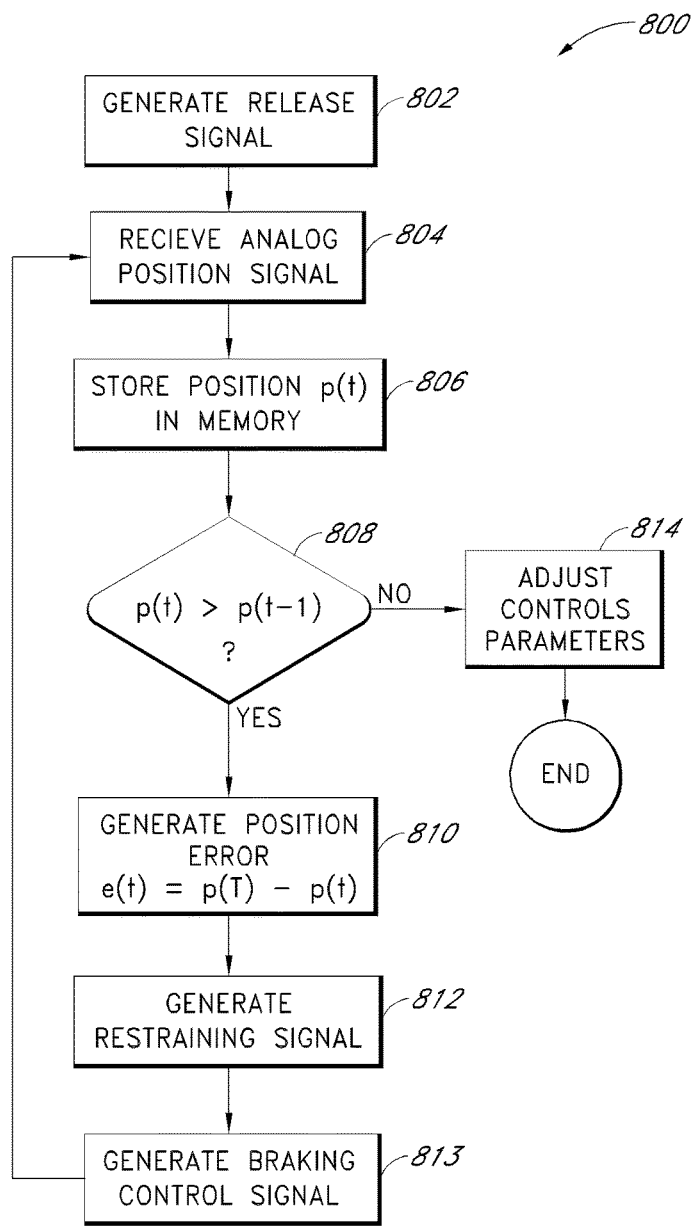
FIG. 8 is a flowchart of codes executed by the processor circuit of FIG. 6 to implement a controller for firing the pressure wave generator shown in FIG. 4.

FIGS. 7 and 8 include representations of blocks of codes, encoded in the program memory 606 for directing the processor 602 to execute a method in accordance with one aspect of the invention. The blocks of codes may be read into the program memory 606 from a CD ROM 612 readable by the media reader 610. Alternatively the blocks of codes may be provided to the program memory 606 through an encoded signal.

Referring to FIG. 7, the blocks of codes shown generally at 700 direct the processor to execute an algorithm for initializing the pressure wave generator 104 for a firing operation. Block 702 directs the processor 602 to read the position signal at the input 544 to check that the piston 410 is located at an initial position. The initial position may be abutting the brake 434 but in practice the initial position of the piston 410 may also be a position partway down the bore 418 of the housing 400. Advantageously, different pressure wave generators 104 may have different initial piston positions, which may be used to account for variations between pressure wave generators or to produce different desired impact kinetic energy for the pressure wave generators.

Block 704 directs the processor 602 to cause the braking control signal to be produced at the output 542 to cause the brake 434 to apply a holding force to the control rod 422. Block 706 directs the processor 602 to cause the fluid control signal to be produced at the output 538 to cause the regulator 442 to apply a desired fluid pressure in the cavity 546 behind the piston 410, thus exerting a motive force on the piston. Block 708 directs the processor 602 to cause the vacuum control signal to be produced at the output 540 to cause the vacuum control valve 432 to be opened, allowing the vacuum pump 430 to at least partially evacuate a cavity 548 in front of the piston 410, so that the piston will not have to displace the air in the cavity 548 as it moves along the bore 418. The pressure wave generator 104 is now ready to be fired and is prevented from moving by the holding force applied by the brake 434.

As previously indicated, it is advantageous to accurately control the timing and kinetic energy of each pressure wave contribution from each pressure wave generator 104. Accordingly, a schedule of positions may be established for each pressure wave generator 104. The schedule for each pressure wave generator 104 may be determined in response to a location of the fusionable material target 140 in the fusion reactor, such that when all the pressure wave generators are fired the resulting pressure wave in the liquid medium 120 will converge to the location of the fusionable material target. The schedule for each pressure wave generator 104 may be stored in the RAM 604 as a table of position values, each successive value in the table representing a desired position at a relative time after the firing of the pressure wave generator.

Referring now to FIG. 8 a firing process is shown generally at 800, represented by blocks of codes that direct the processor 602 to execute an algorithm for controlling the movement of the piston 410 according to the schedule of positions so that the piston impacts the transducer 412 at a desired time and with a desired amount of kinetic energy. Block 802 directs the processor 602 to initiate the firing of the pressure wave generator 104 by generating a release signal and changing the braking control signal at the output 542 of I/O interface 608 in response to the release signal such that the holding force applied by the brake 434 to the control rod 422 is at least partially released, thus causing the piston 410 to be accelerated under fluid pressure towards the transducer 412. The release signal does not cause the braking control signal to completely release the brake 434, since it is necessary to apply some restraining force to the piston 410 to facilitate control of the piston movement along the bore 418. The processor 602 thus causes a restraining signal to be produced that in turn causes the braking control signal to cause the brake 434 to apply some restraining force to the control rod 422. The processor 602 is then able to control the velocity of the piston 410 by altering the restraining signal thus causing the braking control signal to be changed, which in turn causes the restraining force applied by the brake 434 to be either reduced to allow the piston 410 to speed up, or increased to cause the piston to slow down.

Conveniently, in this embodiment, the brake 434 may be used to apply both the holding force and the restraining force. The braking control signal produced at the output 542 of the I/O Interface 608 is a combination of the release signal and the restraining signal. The release signal and restraining signal may be digital signals having numeric signal values. Similarly the braking control signal may also be a digital signal, allowing the braking control signal to be derived from a simple summation of the release signal values and the restraining signal values. The I/O interface 608 may subsequently convert the digital braking control signal into an analog braking control signal for controlling the brake 434.

In other embodiments, the holding force may be applied by a separate brake or other holding force generator in which case the release signal may be used to control the separate brake.

Once the holding force is released the piston 410 accelerates due to the fluid pressure in the cavity 546 and the control rod 422 moves along with the piston 410, causing the marks 424 on the control rod to move past the position sensor 450, thus causing a time varying analog position signal to be generated by the position sensor. Block 804 directs the processor 602 to receive the analog position signal at the input 544 and to convert the analog signal input into a plurality of digital values, p(t), representing successive positions of the control rod 422 (and hence the piston 410) in real time. Block 806 directs the processor 602 to store the digital values in the RAM 604.

Block 808 directs the processor 602 to compare a value p(t), representing the present position of the piston 410 with a value p(t−1) stored in RAM 604, representing a previous position of the piston. If p(t) is greater that p(t−1) then the piston is still moving toward the transducer 412 and the codes in block 810 direct the processor 602 to compare p(t) against a desired piston position value p(T), from the schedule of positions, to establish a position error value e(t). If the position error value e(t) is negative then the present position of the piston 410 is ahead of the scheduled position, and block 812 directs the processor to generate a restraining signal that will cause an appropriate restraining force to be applied to the control rod 422 in order to slow down the piston 410. The restraining signal may be calculated using a system transfer function comprising a mathematical expression of the relationship between the position error value e(t) and the appropriate restraining signal that will cause the braking control signal to cause the brake 434 to apply the appropriate restraining force to the piston 410. On the other hand if the position error value e(t) is positive then the present position of the piston 410 is behind the scheduled position, and block 812 directs the processor to generate a restraining signal that will cause an appropriate restraining force to be applied to the control rod 422 in order to allow piston 410 to speed up.

Block 813 then directs the processor 602 to produce the braking control signal at output 542 of the I/O Interface 608 in response to the restraining signal such that an appropriate restraining force is applied to the control rod 422 by the brake 434. The processor 602 is then directed back to block 804 for further repetition of the blocks 804 to 813. In one embodiment, the piston is accelerated to a velocity of 70 meters per second and blocks 804 to 803 are repeated every 10 nanoseconds, allowing the impact of the piston 410 to be controlled with a resolution of around 1 micrometer.

If at block 808, p(t) is less than or equal to p(t−1) then the piston 410 has impacted the transducer 412 and has either stopped moving or rebounded in the opposite direction. The processor 602 is then directed to block 814 ending execution of the blocks of code 804 to 813.

The block 814 may include codes for implementing an adaptive control algorithm, making the system less sensitive to changing environmental conditions such as temperature, mechanical variances over time of the pressure wave generators 104, and mechanical variances, between different pressure wave generators. Accordingly block 814 may direct the processor 602 to modify the transfer function based on a completed operation of the pressure wave generator. The transfer function may include a mathematical expression having a number of parameters. The parameters may define various gains of components of the pressure wave generator 104 that may vary over time. The processor may use stored values of p(t) and e(t) to calculate a new set of parameters for the transfer function. Advantageously, the adaptive control algorithm may be used to account for wearing in of the pistons and other environmental disturbances that would be more difficult to account for in a conventional linear control algorithm.

Block 702 in FIG. 7 then directs the processor 602 to cause the piston 410 to be returned to the initial position in preparation for the next firing of the pressure wave generator 104. In one embodiment the fluid pressure may be removed from the fluid port 408 and a fluid pressure may be applied to the vacuum conduit 428 thus driving the piston back to the initial position. Block 702 directs the processor 602 to read position signals at the input 544 to confirm that the piston 410 is returned to the initial position.

The operation of the piston 410 and the transducer 412 will now be described with reference to FIG. 20. As previously described, the piston 410 is accelerated along the bore 418 by fluid pressure applied to the cavity 546 of the pressure wave generator 104. The piston 410 is dimensioned so that there is a very small gap between the bore 418 and the piston 410 and when fluid pressure is applied to the cavity 546, some of the fluid leaks through the conduit 2014 and establishes an air cushion between the orifices 2016 and 2018 and the bore 418. As previously indicated, a plurality of such orifices are circumferentially located around the piston 410 and the plurality of air cushions, so established, form a cushion of air between the piston 410 and the bore 418, thus virtually eliminating friction between the piston and the bore.

The transducer 412 operates by receiving kinetic energy from the piston 410 and converting the kinetic energy into a pressure wave in the liquid medium 120. The outer surface 2030 of the transducer 412 is in contact with the liquid medium 120 and the pressure exerted by liquid medium 120 exerts a force on the transducer 412 that biases the transducer 412 into contact with the tapered wall portion 2022 prior to impact. When the piston 410 impacts the transducer 412, the kinetic energy of the piston at least partially transfers to the transducer 412. The transferred kinetic energy initially accelerates the impact surface 2031 of the transducer. However, at the instant of impact the outer surface 2030 of the transducer 412 is at rest, resulting in the transducer being elastically compressed by the impact. The impact thus causes a compression wave to propagate through the transducer 412 from the impact surface 2031 to the outer surface 2030. The outer surface 2030 is also later accelerated by the impact which increases the kinetic energy at the outer surface. The pressure wave coupled into the liquid medium 120 thus includes energy from the compression wave in the transducer 412 and kinetic energy due to the displacement of the transducer within the bore 2026. The energy in the compression wave couples directly into the liquid medium 120 while the kinetic energy causes a pressure wave to be produced at the outer surface 2030 by locally compressing the liquid medium.

At impact, the piston 410 is still under the motive force of the applied fluid pressure, which together with the kinetic energy of the piston may be operable to cause the piston to continue to move with the impact surface 554 of the piston in contact with the impact surface 2031 of the transducer. The impact also causes a compression wave at an impact surface 554 of the piston 410, which propagates toward a rear surface 555 of the piston. At the rear surface 555, the compression wave is reflected back in the direction of the impact surface 554 but with a 180 degrees phase shift, i.e., the compression wave becomes an extension wave thus de-compressing the piston material.

Since the transducer 412 and the liquid medium 120 will typically be different materials (transducer 412 may be steel), there may be an impedance mismatch at the outer surface 2030, resulting a reflection of energy back towards the impact surface 2031 of the transducer. If this reflection is sufficiently large the piston 410 may be caused to rebound against the applied fluid pressure. In one embodiment it is desirable to minimise any reflection of energy at the outer surface 2030 in order to minimise the rebound of the piston 410. Methods and apparatus for reducing the impedance mismatch are described below.

Once the kinetic energy has been coupled into the pressure wave in the liquid medium 120, the pressure wave travels toward the target 140 and initiates fusion in the fusionable material 138. Some of the energy that is not dissipated in initiating the fusion reaction will continue to propagate across the inner cavity 122 to the wall 102 of the fusion reactor 100. Additionally, for a fusionable material 138 of deuterium-tritium (D-T), approximately 20% of the fusion energy will be released in the form of fast alpha particles. These alpha particles have a very short range in the liquid medium 120 and will therefore deposit their energy in a very small volume near the location of the target 140. The alpha particle energy produces a further pressure wave that is directed outwardly towards the wall 102. When these pressure waves reach the transducer 412 they generate a restoring force returning the transducer back to its initial position. Some of the energy may also couple into the transducer as a compression wave, which may cause the piston 410 to rebound rearwardly. Advantageously the rebound may be used to at least partially return the piston 410 to its initial position, while the fluid pressure is still applied, thus conserving the energy required to pressurise the fluid.

Figure 21:
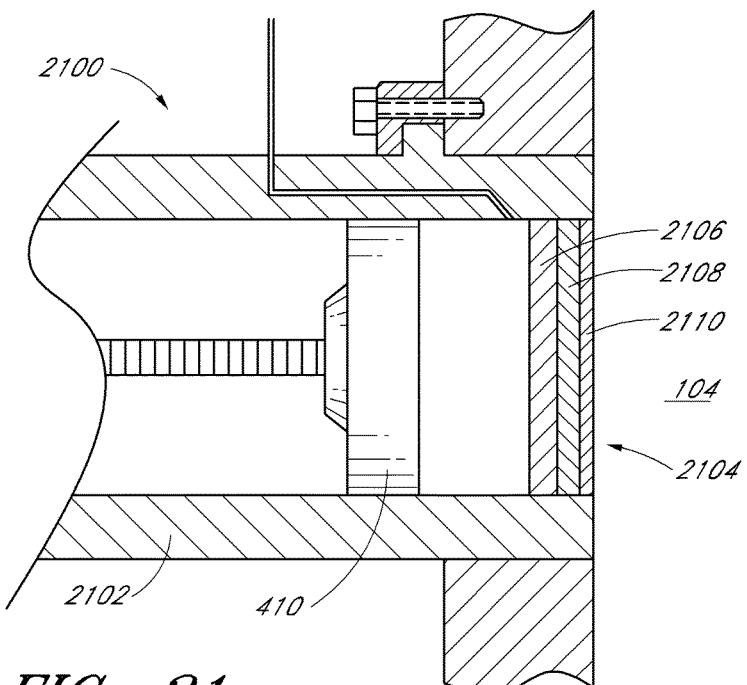
FIG. 21 is a cross-sectional view of an alternative embodiment of a pressure wave generator.

Referring to FIG. 21, an embodiment of a pressure wave generator for improving an impedance match between the piston 410 and the liquid medium 120 is shown generally at 2100. The pressure wave generator 2100 includes a housing 2102 that accommodates a transducer 2104 and the piston 410. The transducer 2104, which in this embodiment does not have a conically tapered shape, further includes a layer of steel 2106, a layer of titanium 2108 and a layer of aluminum 2110. The layers 2106, 2108, and 2110 are fused or otherwise secured to each other to form the transducer 2104.

The acoustic impedance, Z, of a material is defined as:

$$Z = \rho \cdot V \quad \text{Equation 1}$$

where $\rho$ is the density of the medium through which the pressure wave travels and V is the acoustic velocity of that material. The fraction of reflected energy for normal incidence at an interface between two different materials is given by $$R = \left[\frac{Z_2 - Z_1}{Z_2 + Z_1}\right]^2 \quad \text{Equation 2}$$

where R is the fraction of reflected energy at an interface between a first material having an acoustic impedance $Z_1$, and a second material having an acoustic impedance $Z_2$. Values of $\rho$, V and Z for some common materials are listed in Table 1.

Clearly, from Equation 2, when $Z_1$ and $Z_2$ are equal, no energy is reflected at the interface but when $Z_1$ and $Z_2$ are different, some fraction of the energy is reflected at the interface.

TABLE 1

| Material | Density [kg · m$^{-3}$/1000] | Acoustic Velocity [km · s$^{-1}$] | Acoustic Impedance [10$^6$ Rayls] |
| --- | --- | --- | --- |
| Steel | 7.9 | 5.2 | 41 |
| Lead | 11.3 | 1.2 | 12 |
| Titanium | 4.5 | 5.0 | 22.5 |
| Aluminum | 2.7 | 5.2 | 14 |

In the case where the liquid medium is molten lead, a direct steel-lead interface (i.e., the transducer 412 is made from steel and no conical taper), the impedance mismatch results in about 30% of the energy being reflected back from the interface between the transducer 412 and the liquid medium 120 (calculated using Equation 2 and the values in Table 1).

In operation the compression wave through the transducer 2104 propagates through the layer 2106 to an interface between the layers 2106 and 2108 which is a steel-titanium interface. The reflection at this interface may be calculated to be approximately 8.5% using equation 2. The compression wave, now diminished by 8.5%, continues to propagate to the interface between the layers 2108 and 2110 which is a titanium-aluminium interface. The reflection at this interface is a further 5.4% or 5% of the initial compression wave. The compression wave then propagates to the interface between layer 2110 and the liquid medium 120, which is an aluminum-lead interface. In this case the reflection is a further 1% or 0.6% of the initial compression wave. The total reflection is thus reduces to around 14% (8.5%+5%+0.6%), showing that by choosing a suitable material composition of the transducer 2104 the energy reflection may be substantially reduced. In practice, a variety of materials may be used for the layers for impedance matching the transducer and the liquid medium.

Figure 22:
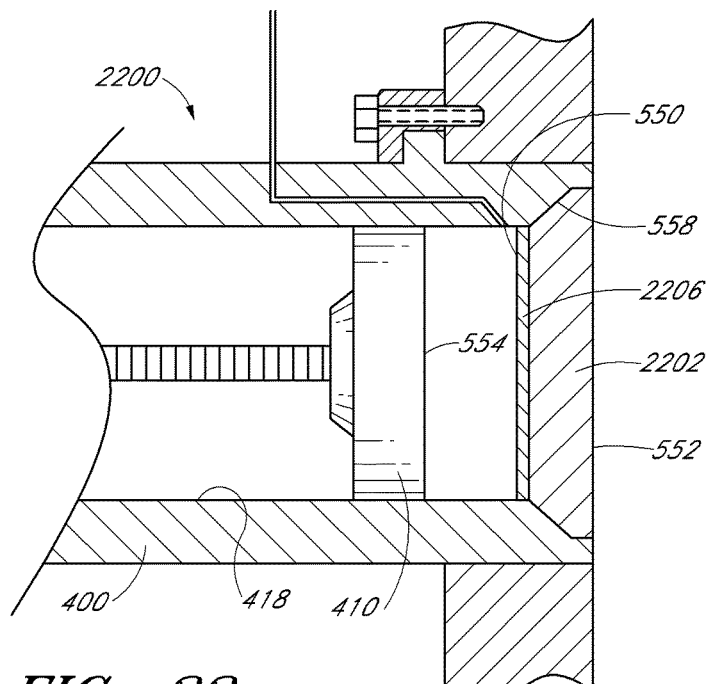
FIG. 22 is a cross-sectional view of another alternative embodiment of a pressure wave generator.

Referring to FIG. 22, further improvement in the impedance match may be obtained by using a tapered transducer 2202. The transducer 2202 includes a first surface 550, a second surface 552 and a conical taper 558 between the first and the second surface such that the second surface has a greater area than the first surface. The taper 558 increases the mass of lead that the transducer 2202 interacts with at the second surface 552 compared to an un-tapered transducer that has equal area at each of the first and the second surfaces. For example, for a steel transducer having a smaller diameter of 10 cm and a 1.5 cm taper, the piston area of the first surface 550 is 79 $cm^2$ while the area of the second surface 552 is 133 $cm^2$, resulting is a 70% greater area in contact with the liquid medium 120. The reduction in reflected energy may be estimated by considering that there is an apparent increase in the density of the liquid medium 120 approximately 1.7 times, which results in a reduction in the reflection from the 30% to approximately 11% for the case of a steel to lead interface.

In practice, a combination of taper 558 and different material layers may be employed to achieve the best overall impedance match between the transducer 412 and the liquid medium 120.

Referring again to FIG. 22, another embodiment of a pressure wave generator further includes a conformal disk 2206, attached to the transducer 2202. The conformal disk 2206 may include copper, a soft aluminium alloy, or a synthetic material, or a composite of two or more materials.

Referring to FIG. 5, if the impact surface 554 of the piston 410 and the transducer 412 are not parallel, the impact stresses may be concentrated over less than the full surface of the piston and the transducer. The stress concentration may result in local deformation or wear of the impact surface 554, which may represent a risk for early failure of the pressure wave generator 104.

Referring again to FIG. 22, in operation the impact surface 554 of the piston 410 impacts the conformal disk 2206, which is able to deform to take up any misalignment between the piston and the transducer 2202. In service, the conformal disk 2206 may become so deformed as to lose effectiveness for its intended purpose. Advantageously, the conformal disks 2206 may be may be removable, thus allowing replacement after the conformal disk nears an end of its useful service period.

Alternatively, a layer of conformal metal such as copper may be electroplated onto the impact surface 554 of the piston 410, or on the first surface 550 of the transducer 2202.

The use of the piston 410 together with a moveable transducer 412 has several advantages over the use of a piston that directly impacts the wall 102 of the fusion reactor 100. A first advantage is that direct impact with the wall 102 of the reactor 100 may introduce high stresses in the wall at the location of the impact, making it necessary to either limit the kinetic energy of the impact or to design the wall to withstand such impact stresses. The use of the moveable transducer 412 mitigates the problem of stresses in the wall of the vessel.

A second advantage is gained in ease of alignment of the pressure wave generators 104. As previously indicated, it is very important that the pressure wave converge symmetrically on the fusionable material 138, which means that the fusion reactor 100 may need to be constructed to tight tolerances. The tolerances may be relaxed for a fusion reactor 100 that uses the piston 410 together with the transducer 412 since the pressure wave in the liquid medium 120 is originated at the outer surface 2030 of the transducer and the transducer may be aimed by aligning the pressure wave generator 104. As previously indicated, the longitudinal position and aim of the pressure wave generator 210 may be adjusted using shims 2012 or other adjustment mechanism. Since the fusion reactor 100 may be several meters in diameter, or larger, with the wall 102, being around 15 cm thick, an opportunity to reduce the manufacturing tolerances thereof may represent a potential cost reduction. Advantageously, the transducers 412 facilitate the generation of a pressure wave that symmetrically envelopes and converges on the fusionable material target 140.

Referring to FIG. 3 in one embodiment the fusion reactor 100 includes an alignment system for generating alignment information regarding the pressure wave generators 104. The alignment system utilizes the plurality of ultrasonic transceivers 152, mounted on the wall 102 between the pressure wave generators 104. Sub groups of the plurality of ultrasonic transceivers may be arranged to form a phased array of transceivers, which form the basis of a sonography system, similar to sonographic imaging systems used in medical diagnostic imaging.

In operation of the alignment system, individual transceivers 152 in the phased array are excited by signal pulses at the same frequency, but at different phase angles. This results in an ultrasonic beam being focused on an inside surface of the wall 102 of the fusion reactor 100. The frequency and phase of the signal pulses is selected to focus the beam toward a particular opening 302 accommodating a particular pressure wave generator 104 and transducer 412. The surface of the transducer 412 reflects the beam back to one of the transceivers 152 which is switched into a receiving mode. The transceiver in the receiving mode converts the received reflection into a signal waveform that is analysed to determine the elapsed time between transmitting the signal pulse and receiving a reflected pulse. The distance between the phase array and surface of the transducer 412 may then be calculated from the elapsed time and the speed of sound in the liquid medium 120. Since symmetry is more important than the exact dimensions in the fusion reactor, it is not important to have an accurate knowledge of the speed of sound in the liquid medium 120, as long as the environmental conditions do not change sufficiently over the course of the alignment, thus affecting the results.

By selecting other sub groups in the plurality of transceivers 152, and/or by altering the phase of the signal pulses, a plurality of measurements may be made of all areas of the inside of the fusion reactor 100. The plurality of measurements may be analysed to provide a map of the inside surface of the fusion reactor 100, allowing the measurement of the relative alignment of each pressure wave generator 104 with respect to other pressure wave generators. If necessary, a particular pressure wave generator 104 may be shimmed or otherwise adjusted to correct any detected misalignment.

Alternatively, the transceivers 152 may be operated in a different mode where a single divergent beam is transmitted from one transceiver, and a returned reflection is received by an array of transceivers. By examining the elapsed time and the relative phase of the signals generated by the array of transceivers in response to the reflected beam, a mapping of the interior surface of fusion reactor 200 may be performed.

In some embodiments the piston 410 may be used without the transducer 412 while still employing the control features described herein (the brake 434, the position sensor 450, the control rod 422, and the controller 142). In such an embodiment the piston 410 may be disposed to directly strike the wall 102 of the fusion reactor 100. Similarly, in other embodiments the piston 410 and the transducer 412 may be used without implementing all of the control features described herein.

Figure 18:
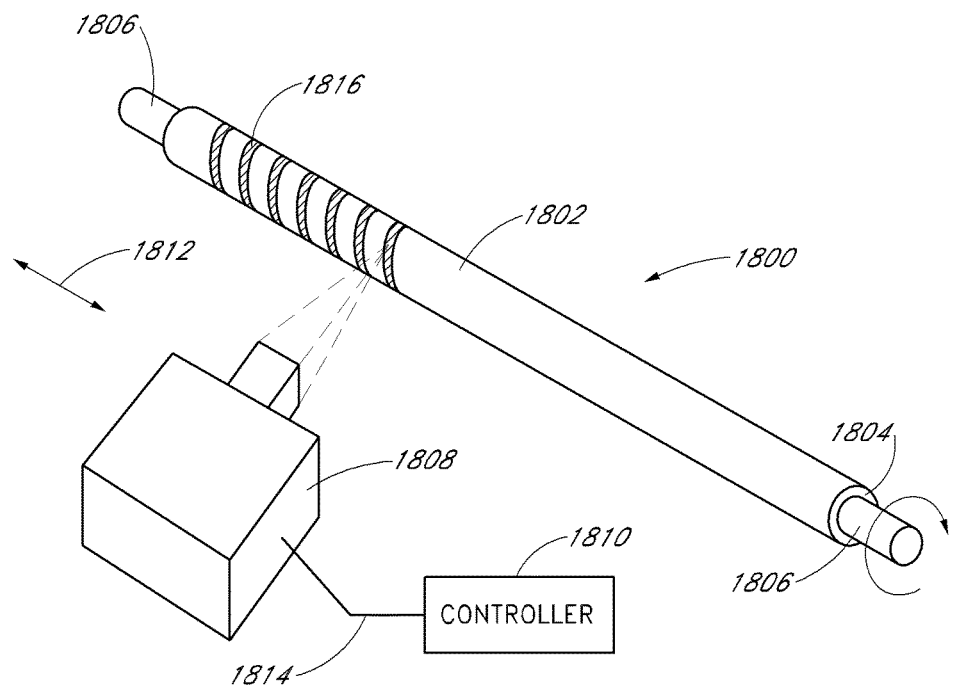
FIG. 18 is a perspective view of a system for fabricating a control rod for implementing the pressure wave generator of FIG. 4.

Referring to FIG. 18, a system for fabricating the control rod 422 is shown generally at 1800. In this embodiment the control rod 422 is fabricated from a steel tube 1804, but it may also be fabricated from a solid steel rod. Advantageously the steel tube 1804 may be a commonly available hardened steel shaft, which are available in a range of sizes and have good roundness and surface finish. The control rod may have a circular cross section. The achievable position sensing resolution will also depend on the size and spacing of the marks 424, but the marks should not interfere with the operation of the brake 434. A convenient size for the marks 424, which should provide sufficient position resolution, would be 10 µm marks at a 10 µm spacing.

The steel tube 1804 is placed on a mandrel 1806 and mounted in a lathe type machine (not shown), that is capable of rotating the steel tube 1804. The surface 1802 is first coated with a photoresist solution. Advantageously the photoresist may be sprayed onto the surface 1802 while the steel tube 1804 is being rotated in the lathe machine. The photoresist coated surface 1802 is then exposed to imaging radiation using an exposure source 1808. A suitable exposure source is the SQUAREspot® Thermal Imaging head manufactured by Creo Inc, of Burnaby British Columbia. The SQUAREspot® Thermal Imaging head provides a laser power of 20 Watts or more in a plurality of controllable imaging beams, each beam having a diameter of around 8 µm.

The exposure source 1808 is moveable in a transverse direction shown by arrow 1812 and further includes a controller 1810. The controller 1810 includes data and control lines 1814 for providing data defining a desired pattern and for controlling the exposure source 1808. The controller 1810 includes circuitry for generating image data defining a pattern of indicia to be formed on the control rod 422 and also controls the lathe machine rotation and the transverse movement of the exposure source 1808. The exposure source 1808 is directed by the controller 1810 to image a plurality of bands 1816 corresponding to the desired size and spacing of marks 424. The imaging beams selectively pattern the photoresist layer, hardening exposed areas of photoresist while leaving unexposed areas unchanged.

Figure 19:
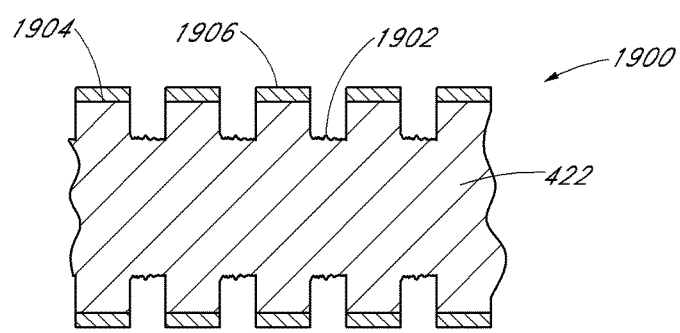
FIG. 19 is a cross-sectional view of the control rod fabricated by the system shown in FIG. 18.

The steel tube 1804 is then removed from the lathe and placed in a suitable etch solution. The etch solution only attacks the unexposed areas while the hardened areas of resist protect the underlying surface 1904. Referring now to FIG. 19, a portion of an etched steel tube is shown in greater detail at 1900. The areas 1904 are protected from the etch solution by the hardened photoresist layer 1906, while the areas 1902 are unprotected and are thus attacked by the etch solution. The etched areas 1902 have a rough texture, due to the activity of the etch solution, and also have a slight radial offset from the surface 1904 of the steel tube 1900. In a subsequent step these areas 1902 may be chemically blackened to further reduce their reflectivity. The photoresist layer 1906 may then be removed, leaving a smooth, un-etched surface 1904 exposed. The marks 424 are defined by a plurality of alternating reflective smooth surface areas 1904 and less reflective rough areas 1902. The smooth reflective areas 1904 provide a suitable surface for applying a braking force, while the areas 1902, which are slightly recessed from the surface 1904, do not interfere with the operation of the brake.

While specific embodiments of the invention have been described and illustrated, such embodiments should be considered illustrative of the invention only and not as limiting the invention as construed in accordance with the accompanying claims.

What is claimed is:

1. A pressure wave generator for generating a pressure wave in a liquid medium, the pressure wave generator comprising:
   a movable piston;
   a control rod coupled to the piston;
   a transducer configured to be coupled to the liquid medium;
   a housing having an inner bore, a first end, and a second end, the movable piston and at least a portion of the control rod disposed in the inner bore of the housing, the transducer slideably accommodated in an opening at the second end of the housing, the inner bore comprising a first cavity between the first end and the movable piston and a second cavity between the movable piston and the transducer, wherein the first cavity is configured to receive a fluid for applying fluid pressure to the movable piston to accelerate the movable piston toward the transducer, and wherein the movable piston is configured to move within the second cavity toward the transducer;
   a position sensor configured to generate a position signal representing a position of the movable piston;
   a controller operatively coupled to the position sensor, wherein the controller is configured to generate a control signal based at least in part on the position signal; and
   a brake operatively coupled to the controller, the brake configured to apply a restraining force to the control rod in response to the control signal such that the movable piston impacts the transducer at a desired time and with a desired kinetic energy,
   wherein the movable piston and the transducer are configured to convert part of the desired kinetic energy of the movable piston into a pressure wave in the liquid medium upon impact of the movable piston with the transducer.

2. The pressure wave generator of claim 1, wherein the second cavity is configured to be at least partially evacuated.

3. The pressure wave generator of claim 1, further comprising a latch coupled to at least one of the control rod and the movable piston, the latch configured to hold the movable piston stationary in presence of fluid pressure on the movable piston.

4. The pressure wave generator of claim 1, wherein the position sensor comprises an optical sensor.

5. The pressure wave generator of claim 4, wherein the control rod comprises a plurality of indicia and the optical sensor is configured to detect reflected light from at least some of the indicia, whereby the position signal of the position sensor is determined based at least in part on the reflected light.

6. The pressure wave generator of claim 1, wherein the brake comprises a magnetic field generator configured to establish a magnetic field that generates eddy currents in the control rod when the control rod moves with respect to the magnetic field generator, thereby providing the restraining force on the control rod.

7. The pressure wave generator of claim 6, further comprising a second brake configured to provide a holding force on at least one of the movable piston or the control rod when the control rod is at rest with respect to the housing.

8. The pressure wave generator of claim 6, wherein the magnetic field generator comprises a magnetic core configured to provide the magnetic field in response to a braking control signal, the magnetic core comprises a gap, and the control rod is moveably positioned in the gap.

9. The pressure wave generator of claim 1, wherein the controller is configured to generate the control signal based at least in part on the movable piston position and a desired position of the movable piston.

10. The pressure wave generator of claim 9, wherein the brake and controller are configured to increase and decrease the restraining force to control a velocity of the movable piston.

11. The pressure wave generator of claim 9, wherein the controller is configured to increase the restraining force applied by the brake if the movable piston position is ahead of the desired position of the movable piston, and reduce the restraining force applied by the brake if the movable piston position is behind the desired position of the movable piston.

\* \* \* \* \*